(12) United States Patent
Chiang et al.

(10) Patent No.: US 8,323,832 B2
(45) Date of Patent: Dec. 4, 2012

(54) NANOSCALE ION STORAGE MATERIALS

(75) Inventors: Yet-Ming Chiang, Framingham, MA (US); Antoni S. Gozdz, Marlborough, MA (US); Martin W. Payne, Avon, OH (US)

(73) Assignee: A123 Systems, Inc., Waltham, MA (US)

( * ) Notice: Subject to any disclaimer, the term of this patent is extended or adjusted under 35 U.S.C. 154(b) by 1296 days.

(21) Appl. No.: 11/672,931

(22) Filed: Feb. 8, 2007

(65) Prior Publication Data
US 2007/0190418 A1 Aug. 16, 2007

Related U.S. Application Data

(63) Continuation-in-part of application No. 11/396,515, filed on Apr. 3, 2006.

(60) Provisional application No. 60/706,273, filed on Aug. 8, 2005, provisional application No. 60/741,606, filed on Dec. 2, 2005.

(51) Int. Cl.
*H01M 4/58* (2010.01)
*H01M 10/44* (2006.01)
*C01B 25/45* (2006.01)

(52) U.S. Cl. ............. 429/221; 429/231.95; 429/50; 423/306

(58) Field of Classification Search .............. 429/221
See application file for complete search history.

(56) References Cited

U.S. PATENT DOCUMENTS

| | | | |
|---|---|---|---|
| 5,609,975 A | 3/1997 | Hasegawa et al. | |
| 5,705,296 A | 1/1998 | Kamauchi et al. | |
| 5,910,382 A | * 6/1999 | Goodenough et al. | 429/218.1 |
| 6,156,931 A | 12/2000 | Lewis | |
| 6,322,929 B1 | 11/2001 | Takada et al. | |
| 6,440,606 B1 | 8/2002 | Yoshizawa et al. | |
| 6,514,640 B1 | 2/2003 | Armand et al. | |
| 6,528,033 B1 | 3/2003 | Barker et al. | |
| 6,596,435 B2 | 7/2003 | Kelley et al. | |
| 6,620,550 B2 | 9/2003 | Christian et al. | |
| 6,632,566 B1 | 10/2003 | Yamada et al. | |
| 6,656,635 B2 | 12/2003 | Okawa et al. | |

(Continued)

FOREIGN PATENT DOCUMENTS

CN 1350342 A 5/2002

(Continued)

OTHER PUBLICATIONS

Chung et al. "Electronically Conductive Phospho-Olivines as Lithium Storage Electrodes." *Nature Materials.* vol. 1, Oct. 2002, 123-128, 6 pages.

(Continued)

*Primary Examiner* — Patrick Ryan
*Assistant Examiner* — Brent Thomas
(74) *Attorney, Agent, or Firm* — Wilmer Cutler Pickering Hale and Dorr LLP

(57) ABSTRACT

Nanoscale ion storage materials are provided that exhibit unique properties measurably distinct from their larger scale counterparts. For example, the nanoscale materials can exhibit increased electronic conductivity, improved electro-mechanical stability, increased rate of intercalation, and/or an extended range of solid solution. Useful nanoscale materials include alkaline transition metal phosphates, such as $LiMPO_4$, where M is one or more transition metals. The nanoscale ion storage materials are useful for producing devices such as high energy and high power storage batteries, battery-capacitor hybrid devices, and high rate electrochromic devices.

11 Claims, 29 Drawing Sheets

Nanoscale lithium iron phosphate ion storage material.

U.S. PATENT DOCUMENTS

| | | | |
|---|---|---|---|
| 6,702,961 | B2 | 3/2004 | Barker |
| 6,716,372 | B2 | 4/2004 | Barker |
| 6,730,281 | B2 | 5/2004 | Barker |
| 6,749,967 | B2 | 6/2004 | Li |
| 6,753,112 | B2 | 6/2004 | Ooya |
| 6,835,500 | B2 | 12/2004 | Masquelier |
| 6,960,331 | B2 | 11/2005 | Barker et al. |
| 7,025,907 | B2 | 4/2006 | Kohzaki |
| 7,282,301 | B2 | 10/2007 | Wixom et al. |
| 7,338,734 | B2 | 3/2008 | Chiang et al. |
| 7,514,181 | B2 | 4/2009 | Ugaji et al. |
| 7,939,201 | B2 | 5/2011 | Chiang et al. |
| 2001/0016284 | A1 | 8/2001 | Kweon |
| 2002/0041998 | A1 | 4/2002 | Hosoya |
| 2002/0047112 | A1 | 4/2002 | Hosoya |
| 2002/0059719 | A1 | 5/2002 | Hosoya |
| 2002/0061274 | A1 | 5/2002 | Hosoya |
| 2002/0086214 | A1 | 7/2002 | Barker |
| 2002/0094481 | A1 | 7/2002 | Goto et al. |
| 2002/0102459 | A1 | 8/2002 | Hosoya |
| 2002/0106563 | A1 | 8/2002 | Okawa et al. |
| 2002/0110736 | A1 | 8/2002 | Kweon et al. |
| 2002/0114754 | A1 | 8/2002 | Hosoya |
| 2002/0124386 | A1 | 9/2002 | Hosoya |
| 2002/0182497 | A1 | 12/2002 | Kohzaki et al. |
| 2002/0192137 | A1 | 12/2002 | Chaloner-Gill et al. |
| 2002/0195591 | A1 | 12/2002 | Ravet |
| 2003/0129492 | A1* | 7/2003 | Barker et al. ............... 429/221 |
| 2004/0005265 | A1 | 1/2004 | Chiang et al. |
| 2004/0175614 | A1 | 9/2004 | Wurm |
| 2005/0003274 | A1 | 1/2005 | Armand et al. |
| 2005/0175525 | A1 | 8/2005 | Fu et al. |
| 2005/0233220 | A1* | 10/2005 | Gozdz et al. ............ 429/231.95 |
| 2006/0194113 | A1 | 8/2006 | Okada et al. |
| 2007/0031732 | A1 | 2/2007 | Chiang et al. |
| 2007/0190418 | A1 | 8/2007 | Chiang et al. |
| 2007/0292747 | A1 | 12/2007 | Chiang et al. |
| 2011/0195306 | A1 | 8/2011 | Chiang et al. |

FOREIGN PATENT DOCUMENTS

| | | |
|---|---|---|
| CN | 1549366 A | 11/2004 |
| CN | 1571195 A | 1/2005 |
| JP | 62271370 | 11/1987 |
| JP | 01-250555 | 10/1989 |
| JP | 3246868 | 5/1991 |
| JP | 05-283075 | 10/1993 |
| JP | 06-283207 | 10/1994 |
| JP | 01-307730 | 11/2001 |
| JP | 02-075356 | 3/2002 |
| JP | 2005060181 A | 3/2005 |
| TW | 200642134 | 12/2006 |
| WO | WO-00/60680 | 10/2000 |
| WO | WO-02089233 A2 | 11/2002 |
| WO | WO-03056646 A1 | 7/2003 |
| WO | WO-03085757 A1 | 10/2003 |
| WO | WO-2005041327 A1 | 5/2005 |
| WO | WO-2005/051840 | 6/2005 |
| WO | WO-2006/046085 | 5/2006 |
| WO | WO-2007/000251 | 1/2007 |
| WO | WO-2008/102270 | 8/2008 |
| WO | WO-2008/102271 | 8/2008 |

OTHER PUBLICATIONS

European Search Report for European Patent Application No. 06844738.2 mailed Nov. 16, 2010. 6 pages.

European Search Report for European Patent Application No. 06851633.5 mailed Nov. 11, 2010. 6 pages.

International Search Report issued for PCT/US2009/031552, dated Sep. 1, 2009.

Meethong et al. "Electronically Induced Phase Transformation in Nanscale Olivines LiMPO (M=Fe, Mn)" *Chemistry of Materials*. 2008, 20, 6189-6198. 11 pages.

Meethong et al. "Strain Accommodation During Phase Transformations in Olivine-Based Cathodes as a Materials Selection Criterion for High-Power Rechargable Batteries." *Advanced Functional Materials*. 2007, 17, 1115-1123. 9 pages.

Meethong, et al., "Size-Dependent Lithium Miscibility Gap in Nanoscale $Li_{1-x}FePO_4$", Electrochemical and Solid State Letters, 10(5):A134-A138 (2007) (5 pages).

Allen et al. "$LI_{1+x}FE_{1-x}PO_4$: Electronically Conductive Lithium Iron Phospho0olivines with Improved Electrochemical Performance." *The Proceedings of the Electromechanical Society, 204th Meeting* Orlando, Florida Oct. 12-16, 2003, Abs. 347 (pre-print).

Amine et al. "High-temperature storage and cycling of $C-LiFePO_4$/graphite Li-ion cells," *Electrochemical Comm.* 7:669-672 (2005).

Chen et al. "Reducing Carbon in $LiFePO_4$/C Composite Electrodes to Maximize Specific Energy, Volumetric Energy, and Tap Density." *Journal of the Electromechanical Society*, 149(9) A1184-A1189 (2002).

Chiang et al., "Defect and Transport Properties of Nanocrystalline $CeO_{2-x}$," *Applied Phys. Lett.*, 69:185-187 (1996).

Chiang et al., "Nonstoichiometry and Electrical Conductivity of Nanocrystalline $CeO_{2-x}$," *Journal of Electroceramics*, 1:7-14 (1997).

Chung et al. "Electronically conductive phospho-olivines as lithium storage electrodes" Nature Materials Online Publication. Sep. 22, 2002. (1-6).

Delacourt et al., "The existence of a temperature-driven solid solution in $Li_xFePO_4$ for 0 £ $X^3$ 1," Nature Materials, 4:254-260 (2005).

Dodd et al., Electrochemical Solid State Lett. 9:A151-A155 (2006).

Huang et al. "Approaching Theoretical Capacity of $LiFePO_4$ at Room Temperature at High Rates," *Electrochemical Solid State Lett.* 4:A170-A172 (2001).

International Search Report, corresponding to International Application No. PCT/US06/46085, mailed Feb. 26, 2008 (4 pgs).

Li et al. "Optimized $LiMn_yFe_{1-y}PO_4$ as the Cathode for Lithium Batteries" *Journal of the Electrochemical Society* 149:A743-A747 (2002).

Meethong et al., "Strain accommodation during phase transformations in olivine-based cathodes as a materials selection criterion for high-power rechargeable batters," *Adv. Functional Mater.*, In press 2006.

Prosini et al. "A New Synthetic Route for Preparing $LiFePO_4$ with Enhanced Electromechanical Performance," *J. Electrochem. Soc.*, 149: A886-A890 (2002).

Shim et al. "The development of low cost LiFePO4-based high power lithium-ion batteries." eScholarship Repository, University of California, 2003. Paper LBNL54098 (8 Pages).

Yamada et al. "Phase Diagram of $Li_X(Mn_yFe_{1-y})PO_4$ (O≦x, y≦1)" *Journal of the Electromechanical Society*, 148(10) A1153-A1158 (2001).

Yang et al., "Reactivity, stability and electrochemical behavior of lithium iron phosphates" Electrochemical Communication, 4:239-244 (2002).

Zhang et al. "Nanostructured $LiMn_2O_4$ prepared by a glycine-nitrate process for lithium-ion betteries" *Solid State Ionics* 171 (2004) 25-31.

Zhou et al. The electronic structure and band gap of $LiFePO_4$; *Solid State Communications* 132 (2004) pp. 181-186.

Chung, "Correspondence: From Our Readers", Nature Materials, 2:702-703 (2003) (2 pages).

Goodenough et al. "Cathodes for Lithium-Ion Batteries: Some Comparisons." Denki Kagaku. vol. 66, No. 12. 1998. Electrochemical Society of Japan. pp. 1173-1181 (9 pages).

Andersson and Thomas, J. Power Sources, 97-98: 498 (2001).

Chiang et al., "Characterization of Grain Boundary Segregation in MgO," J. Am. Ceram. Soc., 64:383-89 (1981).

Chiang et al., Physical Ceramics: Principles for Ceramic Science and Engineering, Chapter 3, John Wiley & Sons (1997).

Chiang, "Introduction and Overview: Physical Properties of Nanostructured Materials," J. Electroceramics, 1:205 (1997).

Delacourt et al., "Two-phase vs. one-phase Li+ extraction/insertion mechanisms in olivine-type materials," Abstract 200, 207th Meeting of the Electrochemical Society, Quebec City, CA, May 15-20, 2005.

Ikeda et al., "Space Charge Segregation at Grain Boundaries in Titanium Dioxide: Part I, Relationship Between Lattice Defect Chemistry and Space Charge Potential," J. Am. Ceram. Soc., 76:2437-2446 (1993).

Ikeda et al., "Space Charge Segregation at Grain Boundaries in Titanium Dioxide: Part II, Model Experiments," J. Am. Ceram. Soc., 76:2447-2459 (1993).

International Search Report and Written Opinion, International Patent Application No. PCT/US06/30579, mailed Sep. 16, 2008 (12 pages).

International Search Report and Written Opinion, International Patent Application No. PCT/US08/52584, mailed Oct. 1, 2008 (8 pages).

Lourenco, A. et al. "Electrochemical and optical characterization of RF-sputtered thin films of vanadium-nickel mixed oxides" Electrochimica Acta 46 (2001) 2257-2262.

Ong, T.S. and Yang, H. "Symmetrical Cell for Electrochemical AC Impedance Studies of Lithium Intercalation into Graphite." Electrochemical and Solid-State Letters, 4(7) A89-A92 (2001).

Srinivasan, V. and Newman, J., Journal of the Electrochemical Society, 151:A1517-A1529 (2004).

Teja, Amyn et al. Continuous hydrothermal synthesis of inorganice nanoparticles (including battery electrode materials). *NanoMaterials for Energy Applications*. Georgia Tech School of Chemical and Biomolecular Engineering. (http://www.che.gatech.edu/research/areas/nanotechnology/energy.php).

Yamada et al., Electrochemical and Solid State Letters, 8:A409-A413 (2005).

Chiang et al. Abstract for "Physical Properties of Cation-Doped Nanoscale Lithium Iron Phosphate." Department of Materials Science and Enginnering, Massachusetts Institute of Technology. 1 Page.

Office Action for U.S. Appl. No. 11/396,515 mailed Feb. 17, 2011. 9 pages.

Office Action for U.S. Appl. No. 11/396,515 mailed Jul. 21, 2010. 17 pages.

Office Action for U.S. Appl. No. 11/396,515 mailed Nov. 4, 2009. 9 pages.

Office Action for U.S. Appl. No. 11/607,525 mailed Jul. 14, 2010. 6 pages.

Office Action for U.S. Appl. No. 11/607,525 mailed Jun. 9, 2011. 5 pages.

Office Action for U.S. Appl. No. 11/607,525 mailed Oct. 27, 2009. 5 pages.

Notification of the Third Office Action for CN 200880009462.2. Jul. 20, 2012. 7 pages.

* cited by examiner

Figure 1. Nanoscale lithium iron phosphate ion storage material.

Bright Field Image

Dark Field Image

US 8,323,832 B2

NANOSCALE ION STORAGE MATERIALS

RELATED APPLICATIONS

This is application is a continuation-in-part of and claims priority under 35 U.S.C. §120 to U.S. patent application Ser. No. 11/396,515 filed Apr. 3, 2006, entitled Nanoscale Ion Storage Materials, which claims the benefit of priority to U.S. Provisional Patent Application No. 60/706,273, filed Aug. 8, 2005 and U.S. Provisional Patent Application No. 60/741,606, filed Dec. 2, 2005, the contents of which are hereby incorporated by reference in their entireties.

BACKGROUND

1. Field

The field includes ion storage materials, and in particular nanoscale ion storage materials useful in devices such as batteries.

2. Summary of Related Art

Ion storage materials are widely employed in storage batteries and other electrochemical devices. Various ion storage materials are known, including alkaline transition metal phosphates. This class of compounds typically has crystal specific gravity values of about 3 g/cm$^3$ to about 5 g/cm$^3$, and can crystallize in a number of structure types. Examples include ordered or partially disordered structures of the olivine ($A_xMXO_4$), NASICON ($A_x(M',M'')_2(XO_4)_3$), $VOPO_4$, $LiVPO_4F$, $LiFe(P_2O_7)$ or $Fe_4(P_2O_7)_3$ structure types, wherein A is an alkali ion, and M, M' and M'' are metals. Many such compounds have relatively low electronic conductivity and alkali ion conductivity, which are less than ideal for electrochemical applications. Many such compounds also exhibit limited solid solution range. For example, $LiFePO_4$ has been widely reported in the scientific literature to have an extremely limited range of solid solution at room temperature.

"Nanocrystalline" ion storage materials have been reported in the literature. For example, Prosini et al. in "A New Synthetic Route for Preparing $LiFePO_4$ with Enhanced Electrochemical Performance," *J. Electrochem. Soc.*, 149: A886-A890 (2002), describe $LiFePO_4$ of 8.95 m$^2$/g specific surface area as nanocrystalline. However, these materials, while somewhat improved, have not been of sufficiently small size scale to provide substantially different properties (e.g., near-theoretical capacity at high rates in excess of 5C) compared to their larger scale counterpart conventional ion storage materials.

SUMMARY

Nanoscale ion storage materials are provided that exhibit unique properties measurably distinct from their larger scale counterparts. For example, the disclosed nanoscale materials can exhibit increased electronic conductivity, improved electromechanical stability, increased rate of intercalation, and an extended range of solid solution.

In one aspect, a lithium transition metal phosphate material for use as an ion storage material is provided, including at least two co-existing phases, including a lithium-rich transition metal phosphate phase and a lithium-poor transition metal phosphate phase, wherein the percentage molar volume difference between the two phases is less than about 6.5%.

In one or more embodiments, the percentage molar volume difference between the two phases of the lithium transition metal phosphate material is less than about 6.40%, or less than about 6.25%, or less than about 5.75%, or less than about 5.5%.

In one or more embodiments, the at least two existing phases of the lithium transition metal phosphate material are crystalline and are defined by a unit cell having lattice parameters for each principal axis, and wherein the difference in lattice parameters for at least two principal axes of the unit cells are less than 3%.

In one or more embodiments, the difference in lattice parameters for all principal axes of the unit cells are less than 4.7%, or the difference in lattice parameters for all principal axes of the unit cells are less than 4.5%, or the difference in lattice parameters for all principal axes of the unit cells are less than 4.0%, or the difference in lattice parameters for all principal axes of the unit cells are less than 3.5%.

In one or more embodiments, the difference in the smallest product of lattice parameters for any two principal axes of lithium transition metal phosphate material is less than 1.6%, or the difference in the smallest product of lattice parameters for any two principal axes is less than 1.55%, or the difference in the smallest product of lattice parameters for any two principal axes is less than 1.5%, or the difference in the smallest product of lattice parameters for any two principal axes is less than 1.35%, or the difference in the smallest product of lattice parameters for any two principal axes is less than 1.2%, or the difference in the smallest product of lattice parameters for any two principal axes is less than 1.0%.

In one or more embodiments, the difference in the largest product of lattice parameters for any two principal axes of lithium transition metal phosphate material is greater than 4.7%, or the difference in the largest product of lattice parameters for any two principal axes is greater than 4.8%, or the difference in the largest product of lattice parameters for any two principal axes is greater than 4.85%.

According to one embodiment, the nanoscale materials have a plane formed by any of the principal axes of the crystal along which the strain measured as a change in the area is less than about 1.6%, or less than about 1.5%, or less than about 1.4%. According to another embodiment, none of the planes formed by any of the principal axes of the crystal have such a strain exceeding 8%, or 7.5%, or 6%.

In one or more embodiments, the lithium transition metal phosphate material has a specific surface area of at least about 20 m$^2$/g, or at least about 35 m$^2$/g, or at least about 50 m$^2$/g.

In one or more embodiments, the lithium transition metal phosphate material is selected from the group consisting of ordered or partially disordered structures of the olivine ($A_xMPO_4$), NASICON ($A_x(M',M'')_2(PO_4)_3$), $VOPO_4$, $LiVPO_4F$, $LiFe(P_2O_7)$ or $Fe_4(P_2O_7)_3$ structure types, wherein A is an alkali ion, and M, M' and M'' are transition metals.

In one or more embodiments, the lithium transition metal phosphate material has an overall composition of $Li_{1-x}MPO_4$, where M comprises at least one first row transition metal selected from the group consisting of Ti, V, Cr, Mn, Fe, Co and Ni, and wherein in use x ranges from 0 to 1. M can include Fe. The material can exhibit a solid solution over a composition range of 0<x<0.3, or the material exhibits a stable solid solution over a composition range of x between 0 and at least about 0.15, or the material exhibits a stable solid solution over a composition range of x between 0 and at least about 0.07 or between 0 and at least about 0.05 at room temperature (22-25° C.). The material can also exhibit a stable solid solution at low lithium content; e.g., where 1<x<0.8 or where 1<x<0.9, or where 1<x<0.95.

In one or more embodiments, the lithium-rich transition metal phosphate phase has the composition $Li_yMPO_4$ and the lithium-poor transition metal phosphate phase has the composition $Li_{1-x}MPO_4$, wherein $0.02<y<0.2$ and $0.02>x>0.3$ at room temperature (22-25° C.). In one or more embodiments, the material can exhibit a solid solution over a composition range of $0<x<0.15$ and $0.02<y<0.10$.

In one or more embodiments, the solid solution of the lithium transition metal phosphate material occupies a fraction of the compositional range of lithium defined as y+x.

In one or more embodiments, the lithium transition metal phosphate material has an overall composition of $Li_{1-x-y}M_{1-z}PO_4$, where M comprises at least one first row transition metal selected from the group consisting of Ti, V, Cr, Mn, Fe, Co and Ni, where x is from 0 to 1 and z can be positive or negative. M includes Fe, z is between about 0.15 and −0.15. The material can exhibit a solid solution over a composition range of $0<x<0.15$, or the material exhibits a stable solid solution over a composition range of x between 0 and at least about 0.05, or the material exhibits a stable solid solution over a composition range of x between 0 and at least about 0.07 at room temperature (22-25° C.). The material may also exhibit a solid solution in the lithium-poor regime, e.g., where $x \geq 0.8$, or $x \geq 0.9$, or $x \geq 0.95$.

In one or more embodiments, the lithium transition metal phosphate material is of a form selected from the group consisting of particles, agglomerated particles, fibers and coatings.

In one or more embodiments, the form has an average smallest cross-sectional dimension of about 75 nm or less, or about 60 nm or less, or about 45 nm or less.

In one or more embodiments, the lithium transition metal phosphate material is in the form of dispersed or agglomerated particles and the average crystallite size as determined by x-ray diffraction is less than about 800 nm, or less than about 600 nm, or less than about 500 nm, or less than about 300 nm.

In one or more embodiments, the form contains less than 3 wt % of a substantially non-lithium-storing conductive phase.

In one or more embodiments, the lithium transition metal phosphate material is crystalline or amorphous.

In one aspect of the invention, a cathode includes a lithium transition metal phosphate material, for example, a lithium transition metal phosphate material having an overall composition of $Li_{1-x}MPO_4$, where M comprises at least one first row transition metal selected from the group consisting of Ti, V, Cr, Mn, Fe, Co and Ni, and wherein in use x ranges from 0 to 1. The material can exhibit a solid solution over a composition range of $0<x<0.3$ or over a range of $0<x<0.15$. An electrochemical cell containing the electrode is also provided.

In another aspect of the invention, a nanoscale crystalline lithium transition metal phosphate is provided that becomes disordered upon delithiation or lithiation having a specific surface area of at least about 25 m²/g. In certain embodiments, a lithium deficient lithium transition metal phosphate is formed.

In another aspect of the invention, a lithium-deficient solid solution lithium transition metal phosphate is provided that is formed upon delithiation at a temperature below 150° C. having a specific surface area of at least about 25 m²/g.

In one or more embodiments, the lithium transition metal phosphate is an ordered olivine structure, and the deficiency occurs on the lithium or M1 sites of the ordered olivine, or the disorder occurs on the lithium or M1 sites of the ordered olivine.

In another aspect of the invention, a lithium transition metal phosphate is provided that transforms upon first charge to disordered olivine having a lithium deficient solid solution and retains such solid solution at temperatures below 150° C., or at temperatures below 100° C., or at temperatures below 50° C.

Still another aspect provides a high power storage battery. The battery contains a cathode, an anode, an electrolyte in contact with and separating the anode and cathode, a cathode current collector in electronic communication with the cathode, and an anode current collector in electronic communication with the anode. The storage battery exhibits specific power of at least about 500 W/kg (1000 W/L) at specific energy of at least about 100 Wh/kg (205 Wh/L), and in some cases exhibits specific power of at least about 1300 W/kg (2500 W/L) at specific energy of at least about 90 Wh/kg (180 Wh/L). In certain embodiments, the battery cathode includes a nanoscale alkaline transition metal phosphate having a specific surface area of at least about 25 m²/g. In some embodiments, the cathode includes particles, fibers or coatings of a nanoscale alkaline transition metal phosphate having an average smallest cross-sectional dimension of about 75 nm or less. In specific embodiments, the cathode includes a composition of formula $Li_{1-x}MPO_4$, where M is one or more transition metals. The composition has a specific surface area of at least about 25 m²/g, and exhibits a stable solid solution over a composition range of x between 0 and at least about 0.03, and in some embodiments up to about 0.15. In particular embodiments, the cathode includes particles, fibers or coatings of a composition of formula $Li_{1-x}MPO_4$, where M is one or more transition metals. The particles, fibers or coatings have an average smallest cross-sectional dimension of about 75 nm or less, and the composition exhibits a stable solid solution at room temperature (22-25° C.) over a composition range of x between 0 and at least about 0.03, and in some embodiments up to 0.15.

In one aspect, lithium transition metal phosphate powder is provided having a specific surface area of at least 15 m²/g and having a lithium content at room temperature (23° C.) that is at least 2 mole % less than the lithium content of a lithium transition metal phosphate of otherwise the same composition that is prepared in a bulk form or as a powder of specific surface area less than about 10 m²/g. It is understood that the powder may be used at any temperature, however, the difference in lithium content is determined relative to room temperature.

In one or more embodiments, the powder has a specific surface area of at least 20 m²/g, or at least 25 m²/g, or at least 30 m²/g.

In one or more embodiments, the lithium transition metal phosphate has an olivine structure.

In one or more embodiments, the lithium transition metal phosphate has a composition $Li_{1-x}MPO_4$, where M is one or more of first-row transition metals, and can be for example at least Fe.

In one aspect, a lithium iron phosphate composition forming a single crystalline phase of the olivine structure at room temperature is provided having a solid solution composition $Li_{1-x}FePO_4$, wherein x is greater than 0.01.

In one or more embodiments, x is greater than 0.02, or greater than 0.03, or greater than 0.04, or greater than 0.05, or greater than 0.06, or greater than 0.07, or greater than 0.08, or greater than 0.09 or greater than 0.10.

In one or more embodiments the lithium iron phosphate has a specific surface area greater than 15 m²/g, or greater than 20 m²/g, or greater than 25 m²g, or greater than 30 m²/g.

In one aspect, a partially lithiated iron phosphate composition of the olivine structure is provided having at room temperature a single crystalline phase of the olivine structure and a solid solution composition $Li_yFePO_4$ wherein y is greater than 0.01.

In one or more embodiments, y is greater than 0.02, or greater than 0.03, or greater than 0.04, or greater than 0.05, or greater than 0.06, or greater than 0.07, or greater than 0.08, or greater than 0.09 or greater than 0.10.

In one or more embodiments the lithium iron phosphate has a specific surface area greater than 15 $m^2/g$, or greater than 20 $m^2/g$, or greater than 25 $m^2/g$, or greater than 30 $m^2/g$.

In one aspect, a lithium transition metal phosphate compound is provided characterized in that, when used as a lithium storage electrode in a standard electrochemical cell wherein the counterelectrode is lithium metal, the compound exhibits a continuously decreasing charging current upon charging in a potentiostatic intermittent titration (PITT) procedure at a constant overpotential of 50 mV above the open-circuit voltage of the cell, said open-circuit voltage being measured after charging to a 50% state of charge and holding for at least 12 hours.

In one or more embodiments, the open-circuit voltage is measured after charging to a 50% state of charge and holding for at least 12 hours at 25° C.

In one or more embodiments, the open-circuit voltage is measured after charging to a 50% state of charge and holding for at least 12 hours over a temperature range of about −20° C. to about 55° C., e.g., 55° C., or 45° C., or 35° C., or 15° C. or 5° C. or 0° C. or −10° C. or −20° C.

In one or more embodiments, the compound is lithium transition metal phosphate $Li_{1-x}MPO_4$, wherein M is one or more first-row transition metals and x has a value between zero and 1.

In one or more embodiments, the lithium transition metal phosphate has an olivine structure.

In one or more embodiments, the compound is $Li_{1-x}FePO_4$, wherein M is one or more first-row transition metals and x has a value between zero and 1.

In another aspect, a lithium transition metal phosphate compound is provided characterized in that, when used as a lithium storage electrode in a standard electrochemical cell wherein the counterelectrode is lithium metal, the compound exhibits a continuously decreasing charging current upon discharging in a potentiostatic intermittent titration (PITT) procedure at a constant overpotential of 50 mV above the open-circuit voltage of the cell, said open-circuit voltage being measured after charging to a 50% state of charge and holding for at least 12 hours.

In one or more embodiments, the open-circuit voltage is measured after charging to a 50% state of charge and holding for at least 12 hours at 25° C.

In one or more embodiments, the open-circuit voltage is measured after charging to a 50% state of charge and holding for at least 12 hours over a temperature range of about −20° C. to about 55° C., e.g., 55° C., or 45° C., or 35° C., or 15° C. or 5° C. or 0° C. or −10° C. or −20° C.

In one or more embodiments, the compound is lithium transition metal phosphate $Li_{1-x}MPO_4$, wherein M is one or more first-row transition metals and x has a value between zero and 1.

In one or more embodiments, the lithium transition metal phosphate has an olivine structure.

In one or more embodiments, the compound is $Li_{1-x}FePO_4$, wherein M is one or more first-row transition metals and x has a value between zero and 1.

The lithium transition metal phosphate compound may be used in a lithium ion storage device, such as a battery.

A method of storing electrical energy includes charging of the lithium storage battery as described according to one or more embodiments at a C-rate of at least 2C, said C-rate being the average C-rate for a current being applied over a period of at least 5 sec.

In one or more embodiments, the method includes charging of the lithium storage battery as described according to one or more embodiments at a C-rate of at least 5C, or at least 10C, or at least 15C, or at least 20C, or at a C-rate of at least 30C, or at least 40C, or at a C-rate of at least 50C.

In one or more embodiments, C-rate is the average C-rate for a current being applied over a period of at least 10 sec, or at least 20 sec, or at least 30 sec.

A method of storing and delivering electrical energy includes charging of the lithium storage battery as described according to one or more embodiments at a C-rate of at least 2C, and discharging at a rate of at least 2C.

In one or more embodiments, the method includes charging of the lithium storage battery as described according to one or more embodiments at a C-rate ranging from at least 5C up to at least 50C.

In one or more embodiments, the method includes discharging at a rate ranging from at least 5C up to at least 50C.

BRIEF DESCRIPTION OF THE DRAWINGS

The following figures are presented for the purpose of illustration only, and are not intended to be limiting.

FIG. 1 is a transmission electron microscope image of a nanoscale lithium iron phosphate ion storage material illustrating nanoscale dimensions.

DETAILED DESCRIPTION

Figure 2B:
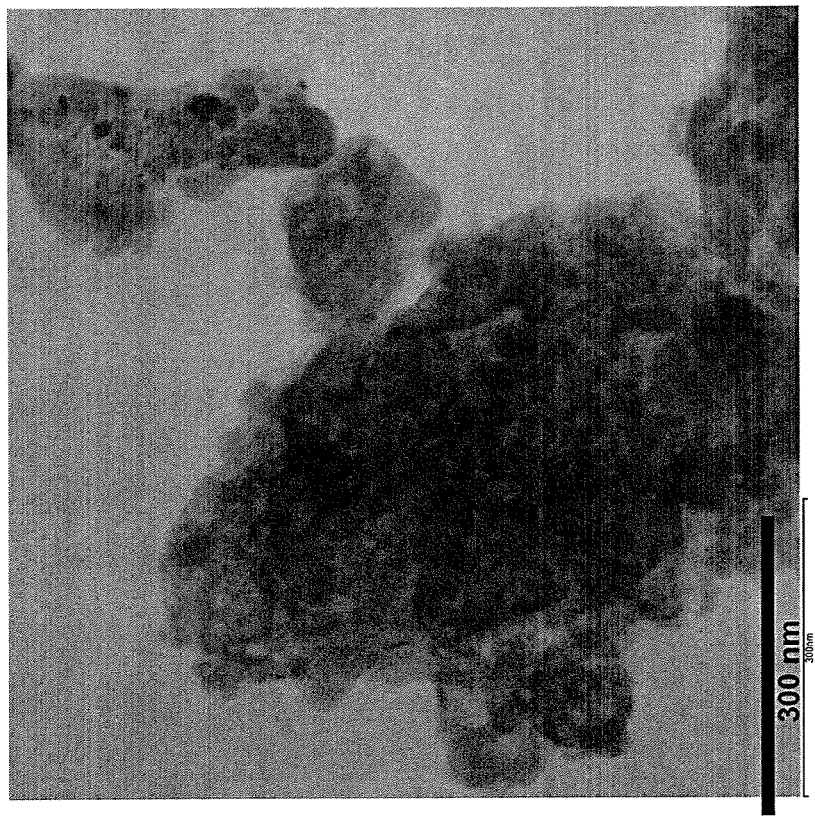
FIGS. 2A-2B show bright-field and dark-field scanning transmission electron microscope images, respectively, of an aggregated nanoscale lithium iron phosphate material.

Nanoscale ion storage materials and devices, such as storage batteries, that use these materials are provided. It has been unexpectedly discovered that ion storage materials having sufficiently small size scale and correspondingly high surface to volume ratio or specific surface area provide fundamentally different physical properties compared to their conventional coarse-grained counterparts. In particular, despite having gross structural similarities such as crystal structure type and basic atomic arrangements, upon preparation or during use the nanoscale materials are compositionally and structurally distinct from, and provide different and improved electrochemical utility and performance compared to, the coarse-grained materials. The difference in relevant physical properties arises because the nanoscale materials are sufficiently small in at least one dimension (for instance, the diameter of an equi-axed particle, the diameter of a nanorod, or the thickness of a thin film), or in 2- or 3-dimensions, that they have different defect chemical, thermodynamic, and mechanical properties. Nanoscale ion storage materials according to one or more embodiments, as described herein, exhibit outstanding electrochemical performance for use in primary or secondary storage batteries.

In particular, the nanoscale materials provide a very high rate capability, while providing a large fraction of the intrinsic charge capacity and energy density of the material. The different properties can be exhibited, for example, in an as-prepared state, upon being thermally equilibrated or partially thermally equilibrated (for instance by heating), or upon equilibrating with a gas phase or condensed phase medium, or upon being assembled and used as a bipolar electrochemical device, including undergoing repeated charge-discharge cycles.

Nanoscale ion storage materials can be crystalline (i.e., nanocrystalline) or amorphous. The unique properties discussed herein are believed to arise from the stresses created by free or internal surfaces or the behavior of the solid in the vicinity of a surface, and therefore the relevant nanoscale dimension is the separation between free or internal surfaces in the material. For example, for a particle that is a single crystallite or that is amorphous, the free surfaces define the cross-sectional dimensions that determine the nanoscale effects. For a particle composed of multiple crystallites, the free surfaces may again define the relevant cross-sectional dimensions, and if these are below the suitable size as described below, the material will exhibit nanoscale properties. The overall particle or aggregate size may exceed these cross-sectional dimensions, yet a crystallite within the aggregate may nonetheless have cross-sectional dimensions defined by the separation between an internal surface (e.g., a grain boundary) and an external surface of the aggregate that are sufficiently small to provide nanoscale properties. Such materials will be suitable for use in an electrochemical device wherein the crystallite has nanoscale properties and at least a portion of the crystallite has an external surface that is accessible to an electrolyte phase when the nanoscale material is used in the device.

The thermodynamically, mechanically, and electrochemically distinct properties described herein reflect a fundamental difference in nature of the nanoscale materials compared to larger scale materials, as opposed to simple or "trivial" size-scaling effects that may have been recognized previously in the art of battery materials. For example, the rate-capability of electrode materials can be limited at least in part by solid-state diffusion of ions in the storage compound. Under such circumstances, an increased rate capability is expected from the use of smaller particles, or thinner films (in the case of thin film batteries), because diffusion times are shorter and charge/discharge rates correspondingly faster for a given transport coefficient or diffusion coefficient. This simple effect of particle size is well-known in the battery field (see, e.g., U.S. Pat. No. 5,910,382, directed to $LiFePO_4$ as an electrode-active material; and Zhang et al. *Solid State Ionics* 171:25-31 (2004), relating to $LiMn_2O_4$), but in no way suggests that other physical properties of a reduced-scale material would fundamentally change at a certain size scale.

As another example, transport in electrochemical systems can be limited by surface reaction rates. A material having finer particle size and corresponding higher surface area will naturally have higher area available for surface reaction. This simple relationship again does not suggest a fundamental change in physical properties occurring at a particular size scale. However, the surface or interfacial chemistry of small scale materials can change due to their size, potentially causing a fundamental improvement in surface reaction rate that benefits rate capability apart from simple changes in available surface area. (See, e.g., Chiang, "Introduction and Overview: Physical Properties of Nanostructured Materials," *J. Electroceramics,* 1:205 (1997), for a discussion of unexpected differences between nanoscale materials and their coarse counterparts, as opposed expected differences based on well-known size-scaling laws.)

As described in more detail below, we have discovered unique behavior and phase composition at the nanoscale for ion storage materials based on alkali transition metal phosphates. Examples include nanoscale ordered or partially disordered structures of the olivine ($A_xMPO_4$), NASICON ($A_x(M',M'')_2(PO_4)_3$), $VOPO_4$, $LiVPO_4F$, $LiFe(P_2O_7)$ or $Fe_4(P_2O_7)_3$ structure types, wherein A is an alkali ion, and M, M' and M'' are metals. Many such compounds have relatively low electronic conductivity and alkali ion conductivity when conventionally prepared, such that for electrochemical applications they benefit from unique properties arising from being in the nanoscale state.

In one or more embodiments, the nanoscale ion storage material has the formula $LiMPO_4$, where M is one or more transition metals. In certain embodiments, the nanoscale material is an ordered olivine ($Li_{1-x}MXO_4$), where M is one or more of V, Cr, Mn, Fe, Co and Ni, and x can range from zero to one, during lithium insertion and deinsertion reactions. In the as-prepared state, x is typically about one. In particular embodiments, the special properties of nanoscale ion storage materials may be augmented by doping with foreign ions, such as metals or anions. Such materials are expected to exhibit similar behavior to that demonstrated herein for $Li_{1-x}FePO_4$ at the nanoscale, based on the scientific principles underlying such behavior. However, doping is not required for a material to exhibit special properties at the nanoscale.

In other embodiments, there is some substitution of Li onto the M-site. In one embodiment, there is about 5 or 10% substitution of Li onto the Fe site. The lithium transition metal phosphate material has an overall composition of $Li_{1-x-z}M_{1-z}PO_4$, where M comprises at least one first row transition metal selected from the group consisting of Ti, V, Cr, Mn, Fe, Co and Ni, where x is from 0 to 1 and z can be positive or negative. M includes Fe, z is between about 0.15 and −0.15. The material can exhibit a solid solution over a composition range of $0<x<0.15$.

Figure 2A:
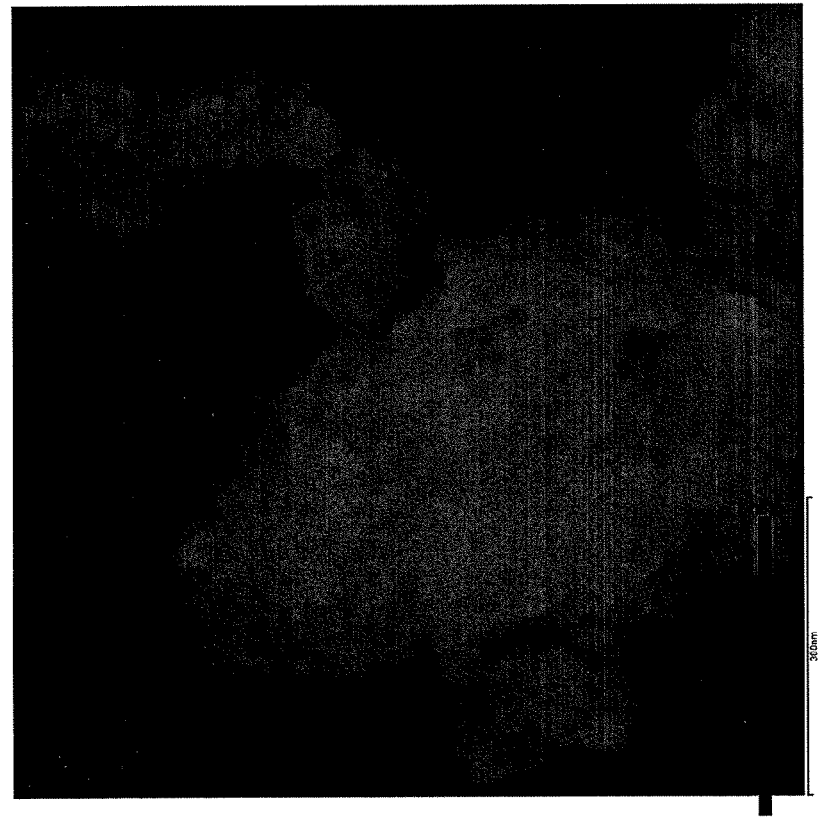
Figure 2E:
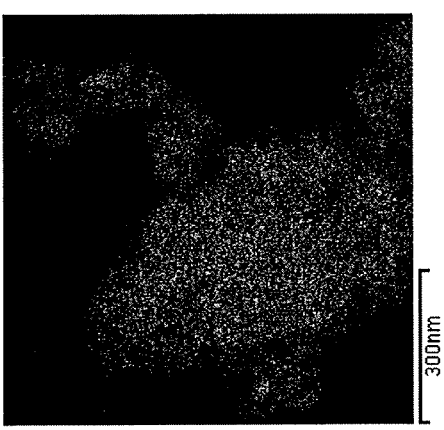
FIGS. 2C-F show Fe, P, O and C elemental maps taken on the sample in FIG. 2B.
Figure 2F:
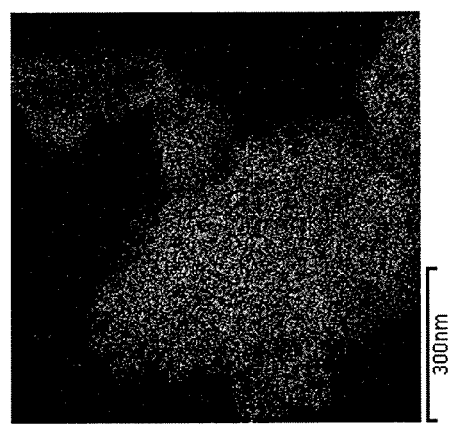
Figure 2C:
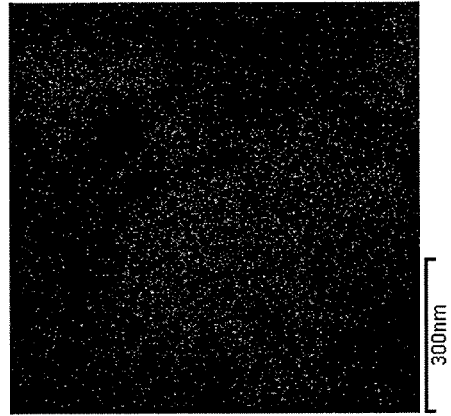
Figure 2D:
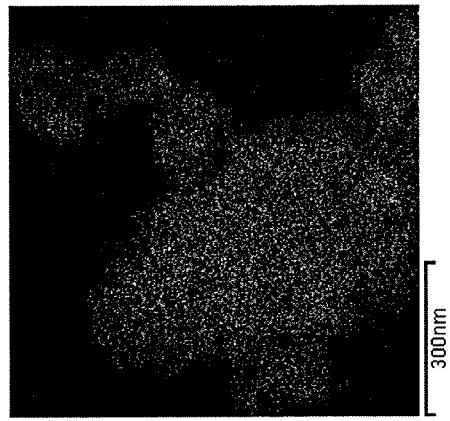

FIG. 1 is a transmission electron microscope image of a nanoscale lithium iron phosphate ion storage material exhibiting particle dimensions on these scales. FIGS. 2A and 2B show bright-field and dark-field scanning transmission electron microscope images, respectively, of an aggregated nanoscale lithium iron phosphate material. FIGS. 2C-2F show Fe, P, O and C elemental maps taken on the sample in FIG. 2A, showing that the distribution of these elements is uniform, i.e. that there are not distinguishable phases or particles rich in one or another of these main constituents.

These nanocrystalline form compositions will possess measurably distinct properties as described herein compared to their larger scale counterparts. For example, the nanoscale materials retain a greater extent of solid solution nonstoichiometry, namely, retain a higher defect content than the coarse-grained material. Such properties are measurable by electrochemical and crystallographic methods well-known to those skilled in the art. When used in electrodes for practical applications, such as a storage battery or other electrochemical device, the nanoscale ion storage materials provide higher charge storage at higher rates of charge or discharge than comparable materials that are not nanoscale.

The nanoscale dimensions that realize the benefits as described herein can be characterized by several methods. Based on results as described in the Examples below, the size-dependent nonstoichiometry and related beneficial properties of nanoscale $LiFePO_4$ and other ion storage compounds increase as the particle size decreases. These properties are significant, measurable, and beneficial at particle sizes below that corresponding to a BET specific surface area of about 20 $m^2/g$. In some instances, materials having a BET specific surface area of at least about 25 $m^2/g$, for example, at least about 30 $m^2/g$, at least about 35 $m^2/g$, at least about 40 $m^2/g$, at least about 45 $m^2/g$, or at least about 50 $m^2/g$ are employed. As used herein, "the BET method" refers to the method of Brunauer, Emmett and Teller, well-known to those skilled in the art of powder characterization, in which a gas phase molecule (such as $N_2$) is condensed onto the surfaces of a material at a temperature (such as 77 K) where the coverage of condensed gas per unit area is well-known, and the total amount of condensed gas on the sample is then measured upon being liberated by heating.

For a given value of the BET specific surface area, and knowing the specific gravity of the material, it is also possible to calculate a corresponding "equivalent spherical particle size." This is the particle diameter that would result in the measured surface area if the material were in the form of identically-sized spherical particles, and is a good approximation of the number-averaged or mean particle size if the particle shape is equi-axed. The particle morphology of the nanomaterials described in certain of the Examples below is nearly spherical, and the equivalent spherical particle size calculated from the BET specific surface area is very close to the average particle diameter directly observed by electron microscopy. Furthermore, the size of crystallites or primary particles, when the materials of the invention are crystalline, can be determined by X-ray line-broadening methods well-known to those skilled in the art. Thus, in certain embodiments, the nanomaterials described herein have an average (i.e., mean) diameter of about 100 nm or less. In some instances, the average diameter is about 75 nm or less, for example, about 70 nm or less, about 60 nm or less, about 50 nm or less, about 45 nm or less, about 40 nm or less, or about 35 nm or less.

The unique properties of a nanomaterial may depend on the smallest cross-sectional dimension. Cross-sectional dimension is here understood to be that family of straight lines that can be drawn through the center of mass of an isolated or separable object. By assuming spherical morphology, the equivalent spherical particle size gives the largest average cross-sectional dimension of a particulate material. On the other hand, a very thin but continuous film, or a very thin but continuous fiber, can exhibit nanoscale effects, even though the dimensions are far larger than nanoscale in the plane of the film or along the axis of the fiber. However, if the smallest cross-sectional dimension, namely the thickness of the film or the diameter of the fiber, is sufficiently small, nanoscale properties may be obtained. Thus, in certain embodiments, for anisometric particles, such as nanorods, nanoplatelets, nanofibers or continuous thin films, the specific surface area and the equivalent spherical particle size may not adequately define the characteristic dimension below which the nanomaterial will exhibit special properties. That is, for highly anisometric particle shapes, in some instances the BET surface area can be larger than the above-mentioned values, yet the material still will exhibit a smallest characteristic dimension sufficiently small to exhibit nanoscale properties as described herein.

If particle morphology is well-known and uniform amongst particles in a sample (for instance, if the average size and aspect ratio of nanorods or nanoplatelets is known, or even if the distribution of such parameters is known), a specific surface area above which nanoscale behavior will be observed can be computed for a given particle shape. However, for simplicity, in at least some such embodiments, nanoscale behavior will be observed if the primary particles of the powder exhibit a smallest cross-sectional dimension that is, on a number-averaged basis to provide a mean value, about 100 nm or less. In some instances, the smallest cross-sectional dimension about 75 nm or less, for example, about 70 nm or less, about 60 nm or less, about 50 nm or less, about 45 nm or less, about 40 nm or less, or about 35 nm or less. These dimensions can be measured using various methods, including direct measurement with an electron microscope of the transmission or secondary-electron type, or with atomic force microscopy. Herein, a primary particle dimension is considered to be the characteristic spatial dimension that a BET surface area measurement would interrogate by adsorbing gas onto exposed surfaces of the material. In the instance of a substantially fully-dense polycrystalline aggregate, it is the dimension of that aggregate. In the case of well-dispersed individual crystallites, it is the crystallite dimension. In the case of particles joined into a sintered network or a porous assembly of the particles, it is the cross-sectional thickness of the branches of the network, or the mean separation between pores that are open to the exterior of the assembly. In the case of an aggregated powder, the agglomerate may have an average crystallite size of less than about 800 nm, or less than about 600 nm, or less than about 500 nm, or less than about 300 nm. In some embodiments, the nanoscale material is a thin film or coating, including a coating on a particle of any size, in which the film or coating has an average thickness of about 100 nm or less, in some cases about 75 nm or less, for example, about 70 nm or less, about 60 nm or less, about 50 nm or less, about 45 nm or less, about 40 nm or less, or about 35 nm or less. The thickness of the film or coating can be measured by various methods including transmission electron microscopy or other microscopy methods that can view the film or coating in cross-section.

In certain embodiments, the nanoscale ion storage materials described herein are prepared from conventional materials by size-reduction processes (e.g., milling) to reduce the particle dimensions into the desired range. However, this can be a highly energy-intensive process. Thus, as illustrated in the Examples below, the materials also can be synthesized in the nanoscale state, by methods including, but not limited to, solid-state reactions between metal salts, wet-chemical methods, such as co-precipitation, spray-pyrolysis, mechanochemical reactions, or combinations thereof. Nanoscale materials with the desired particle sizes and specific surface areas are obtained by using homogeneous reactants, minimizing the reaction or crystallization temperature (in order to avoid particle coarsening), and avoiding formation of liquid phases in which the product is highly soluble (which also tends to lead to particle coarsening). Specific processing conditions can typically be established for a given process without undue experimentation by those skilled in the art.

In some embodiments, nanoscale ion storage materials are prepared by non-equilibrium, moderate temperature techniques, such as wet-chemical or low temperature solid-state reactions or thermochemical methods. The materials thus prepared can acquire properties such as increased nonstoichiometry and disorder and increased solubility for dopants because they are synthesized in a metastable state or because kinetic pathways to the final product differ from those in conventional high temperature processes. Such disorder in the nanoscale form can also be preserved substantially under electrochemical use conditions and provide benefits as described herein.

Until the present experimental results were obtained, it was not known if nanoscale ion storage materials would exhibit fundamentally different physical properties compared to their coarse-grained counterparts, nor was it known what measurable physical properties would differ, nor the size scale that would realize these differences. Useful and advantageous characteristics of nanoscale ion storage materials according to certain embodiments include, but are not limited to, the following.

The materials can exhibit increased electronic conductivity, for example, due to the co-existence in solid solution of higher concentrations of mixed-valence transition metal ions, or changes in the electronic structure related to a closer separation between atomic orbitals providing higher electronic carrier mobility, or both. Typically, the improved electronic conductivity will have a value greater than about $10^{-8}$ S/cm.

The materials can have improved electromechanical stability, such as improved resistance to fracture, due to suppressed or delayed phase transformations during use as a storage electrode. This can allow higher energy, higher rate capability, and longer life of the materials and electrochemical cells using the materials. When electrochemical cycling causes phase transformations, the materials also may exhibit smaller molar volume differences between phases, which contributes to more facile transformation between the phases upon insertion and deinsertion of lithium.

In compounds where ion diffusion has reduced dimensionality, for example, being one-dimensional (along channels) or two-dimensional (along planes) in the crystal structure, the nanoscale material can exhibit increased rate of intercalation, due to the existence of multiple paths out of the particle when there may be blocking immobile ions in the diffusion paths. The diffusion coefficient should be a materials property, not size dependent unless something else changes such as structure or disorder. This phenomenon is illustrated as follows. A particle that is 100 unit cells wide in spatial dimension, assuming each unit cell contains one formula unit of the compound, can have 1% disorder and have only, on average, one disordered atom blocking a given diffusion channel. This will have little impact on diffusion of ions into and out of the particle, since the diffusion channel can be accessed from both ends. In contrast, for a much larger particle having the same degree of disorder, the blocking ions will prevent access to the majority of the channel. The specific value of the chemical diffusion coefficient of the transported ion (e.g., Li in a lithium battery) can be improved by the additional disorder of a nanoscale material, typically to a value greater than about $10^{-16}$ cm$^2$/sec.

These observed properties provide an ion storage material with increased charge storage at higher charge and discharge rates.

Nanoscale ion storage materials as described herein differ from their larger scale counterparts in the composition range in which they can stably exist. In at least some embodiments, the nanoscale compound can exist in a state of extended solid solution compared to the coarse-grained compound at the same temperature. The existence of solid-solution nonstoichiometry is important for improving ion and electron transport, as has been demonstrated in numerous ion-intercalation compounds One aspect of the invention provides a nanocrystalline composition exhibiting a much wider range of solid solution or defect content at a given temperature than a bulk crystal or coarse powder of nominally similar composition and crystalline phase before phase-separating into two or more phases. These features are described in particular detail for $Li_{1-x}FePO_4$, however, it will be apparent to those of skill in the art that application of these principals to other ion storage materials will provide similar results.

As a non-limiting example, the conventional compound $Li_{1-x}FePO_4$ is known to exhibit negligible solid solution nonstoichiometry x at room temperature, x being about 0.002 according to some published literature (Delacourt et al., "Two-phase vs. one-phase Li$^+$ extraction/insertion mechanisms in olivine-type materials," Abstract 200, 207$^{th}$ Meeting of The Electrochemical Society, Quebec City, Calif., May 15-20, 2005; Delacourt et al., "The existence of a temperature-driven solid solution in $Li_xFePO_4$ for $0 \leq x \leq 1$," Nature Materials, 4:254-260 (2005)), about 0.0475 in another publication (V. Srinivasan and J. Newman, Journal of the Electrochemical Society, 151:A1517-A1529 (2004), and about 0.038 in another publication (A. Yamada, H. Koizumi, N. Sonoyama and R. Kanno, Electrochemical and Solid State Letters, 8:A409-A413 (2005). The concentration of lithium that is tolerated in the delithiated compound $Li_yFePO_4$, with which $Li_{1-x}FePO_4$ coexists, is even less. These features are illustrated in the composition-temperature phase diagram for $LiFePO_4$—$FePO_4$, shown in FIG. 3A. The phase composition for an iron phosphate with varying levels of lithium will vary with temperature, and a solid solution exists over wider ranges of lithium concentration at elevated temperatures, e.g., above 150° C. Elevated temperatures are not practical for most ion storage applications and practical applications are constrained to be only slightly elevated above room temperature, e.g., less than about 100° C. Unless otherwise stated, we refer to compositions at a temperature below about 100° C. and typically at room temperature (22-25° C.).

Figures 3A, 3B:
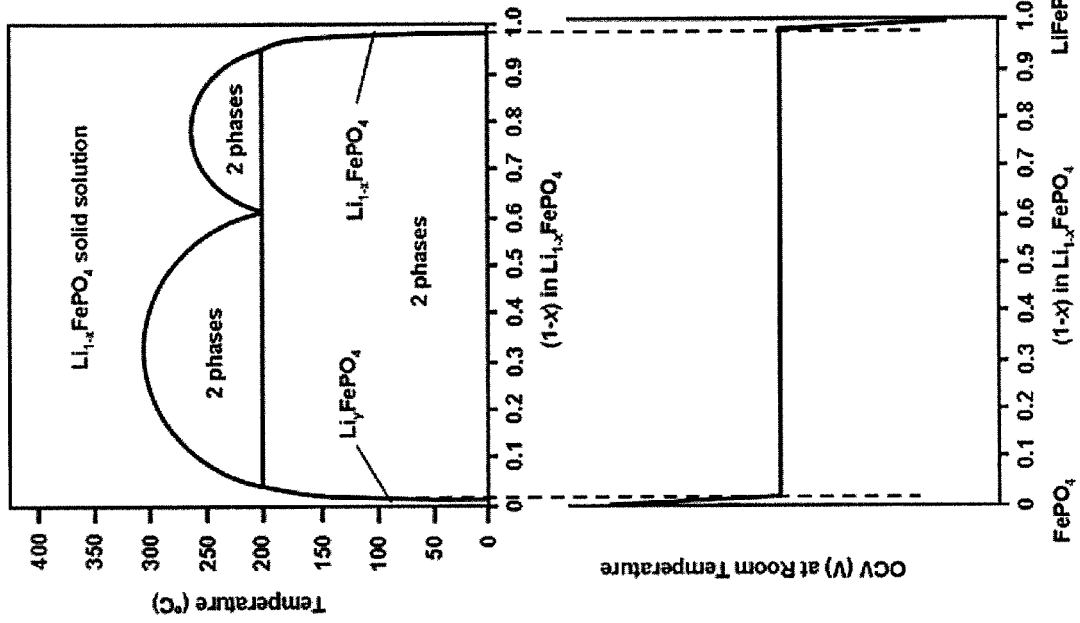
FIG. 3A is a composition-temperature phase diagram for a conventional $Li_{1-x}FePO_4$ ion storage material according to certain embodiments.
FIG. 3B is a voltage vs composition graph for a conventional or coarsened $Li_{1-x}FePO_4$ material.

The phase diagram in FIG. 3A shows that at this temperature range, the solid solution ranges are extremely limited. An illustrative voltage vs. composition plot at room temperature for the ion storage material is shown in FIG. 3B and demonstrates that the voltage curve is flat over most of the compositional range, indicating the presence of a two phase system over almost the entire lithium composition range. In $Li_{1-x}FePO_4$ of a conventional coarse-grained form, the absence of solid solution nonstoichiometry is manifested by decomposition of lithium deficient compositions into two highly stoichiometric compounds having a chemical composition approach that of the end group compositions, $LiFePO_4$ and $FePO_4$. Both of these compounds have low electronic conductivity, due at least in part to the existence of nearly a single iron valence state, $Fe^{2+}$ and $Fe^{3+}$ respectively, in the individual crystallites. In nearly stoichiometric $LiFePO_4$, the lithium diffusion coefficient is likely also very low, due to the absence of lattice vacancies to facilitate Li transport.

Figures 4A, 4B:
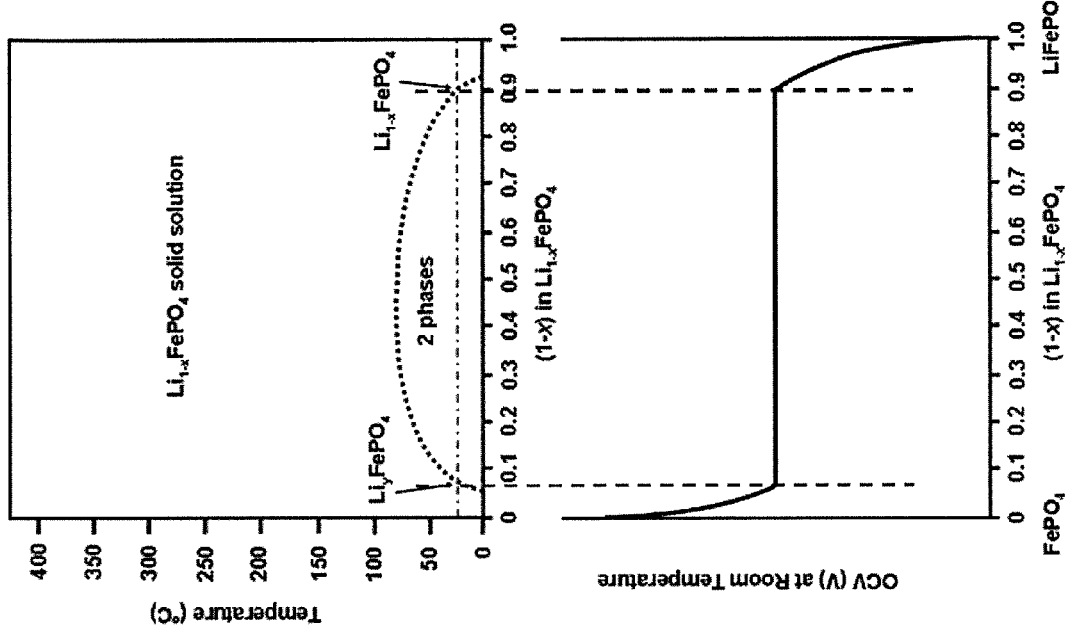
FIG. 4A is a composition-temperature phase diagram for a nanoscale $Li_{1-x}FePO_4$ ion storage material according to certain embodiments of the invention demonstrating an extended region in which solid solution is formed.
FIG. 4B is a voltage vs composition graph for a conventional or coarsened $Li_{1-x}FePO_4$ material; the nanocrystalline form behaves thermodynamically and electrochemically as a distinct material from the conventional or coarsened crystalline state.

In contrast, nanocrystalline $Li_{1-x}FePO_4$ and $Li_yFePO_4$ having a specific surface area measured by the BET method of greater than about 20 m$^2$/g, and in some instances greater than about 30 m$^2$/g, has been found to exhibit x (and y) that are severalfold larger than in the conventional compound. Indeed at room temperature, $Li_{1-x}FePO_4$ can exhibit x as large as 0.05, 0.07, 0.10, 0.15, 0.3 or even greater and y can be as large as 0.05 or 0.1 or 0.2. As illustrated in FIG. 4A, the dashed lines shows the existence of a significant solid solution at temperatures of less than about 50° C. for $Li_{1-x}FePO_4$ and $Li_yFePO_4$. An illustrative voltage vs. composition plot at room temperature for the ion storage material is shown in FIG. 4B. The curve has a demonstrably smaller flat region, indicating that the compositional range of a two-phase system is limited. The sloping regions that flank the flat region indicate the existence of a solid solution. The solid solution end-limits for the two end member phases coexisting in the nanoscale material are larger than for the conventional material. For instance, in $LiFePO_4$ this means having a large lithium deficiency x in the lithium-rich $Li_{1-x}FePO_4$ end member, and a large lithium excess y in the lithium-deficient end member $Li_yFePO_4$, the ideal limiting compositions of these two co-existing phases being $LiFePO_4$ and $FePO_4$ respectively. Thus, during electrochemical cycling, the co-existing phases include a large extent of nonstoichiometry. The higher degree of nonstoichiometry indicates a greater population of both $Fe^{2+}$ and $Fe^{3+}$ at every point within the two-phase region, which provides higher electronic conductivity for the material. In addition, the sloping voltage curve of the nanophosphate permits the functional advantage of allowing state-of-charge monitoring that is not possible or is more difficult and expensive to conduct with materials exhibiting a flat two-phase discharge voltage profiles.

Improved electron and ion transport rates are well-known to improve the rate capability of ion storage materials used in battery technology. In certain lithium transition metal phosphate compounds described herein, both electron and ion transport rates are slow compared to that in some previously used materials (such as $LiCoO_2$ or $LiMn_2O_4$), and those skilled in the art have sought methods by which such transport can be improved. Nanoscale lithium transition metal phosphate compounds exhibit retention of solid-solutions at various states of charge (lithium concentration), and the resulting materials exhibit high rate capability and high energy that have not previously been attainable in these materials.

The nonstoichiometry of non-alkali elements in the subject materials also can vary in the nanocrystalline form. The fundamentally different phase behavior applies to each of the components of the compositional system, although likely to different degrees. Other aspects of atomic level disorder likely also are affected at nanoscale dimensions. For example, in $Li_{1-x}FePO_4$, the site occupancy of the M1 and M2 sites of the ordered olivine structure, occupied solely by Li and Fe in the ideal crystal, can vary in the nanoscale material. There can be disorder or mixing of the Li and Fe cations between the two sites, and vacancy defects can appear on one or both sites. Also, solute cations (dopants) can be more soluble in the nanocrystalline material, or can occupy different sites than they do in the conventional material. In the nanocrystalline state, nonstoichiometry on the oxygen sublattice of the crystal structure also can occur. The solubility of foreign anions, such as sulfur or halogens, can increase as well. In certain embodiments, nanoscale ion storage materials as described herein exhibit one or more of these variations in defect or solid solution behavior. However, as shown by experimental results presented herein, the presence of foreign metals or anions is not necessary to create or define the special properties of the nanocrystalline state.

Differences in physical properties exhibited by the nanoscale materials according to one or more embodiments of the invention compared to their conventional coarse-grained counterparts are readily measurable by standard thermal and electrochemical techniques, such as calorimetry, cyclic voltammetry, galvanostatic intermittent titration (GITT), or potentiostatic intermittent titration (PITT). The improved performance of the nanoscale materials in ion storage applications is also readily measurable, for example, by formulating the nanoscale material into an electrode coating, constructing a nonaqueous electrochemical cell, and performing charge-discharge tests at various current rates.

The state of extended solid solution in the nanoscale material can be confirmed using electrochemical methods. For example, a compound of nanocrystalline $Li_{1-x}FePO_4$ can be tested in a nonaqueous electrochemical cell. The nanocrystalline $Li_{1-x}FePO_4$ serves as the positive electrode against a source of lithium having a total lithium content much greater than the lithium storage capacity of the nanocrystalline electrode, such as lithium foil. This electrochemical cell construction is often referred to as a lithium half-cell by those skilled in the art of lithium-ion batteries. In such a cell, the nanoscale ion storage material is formulated into an electrode, typically using a conductive additive, such as carbon, and a polymeric binder. The nanoscale ion storage material electrode is separated from the lithium metal counterelectrode, typically by a microporous polymer separator. The cell is then infused with a nonaqueous lithium-conducting liquid electrolyte. The charge and discharge rates of the electrode are sufficiently fast that the electrochemical behavior of the nanoscale material can be tested.

Figure 5:
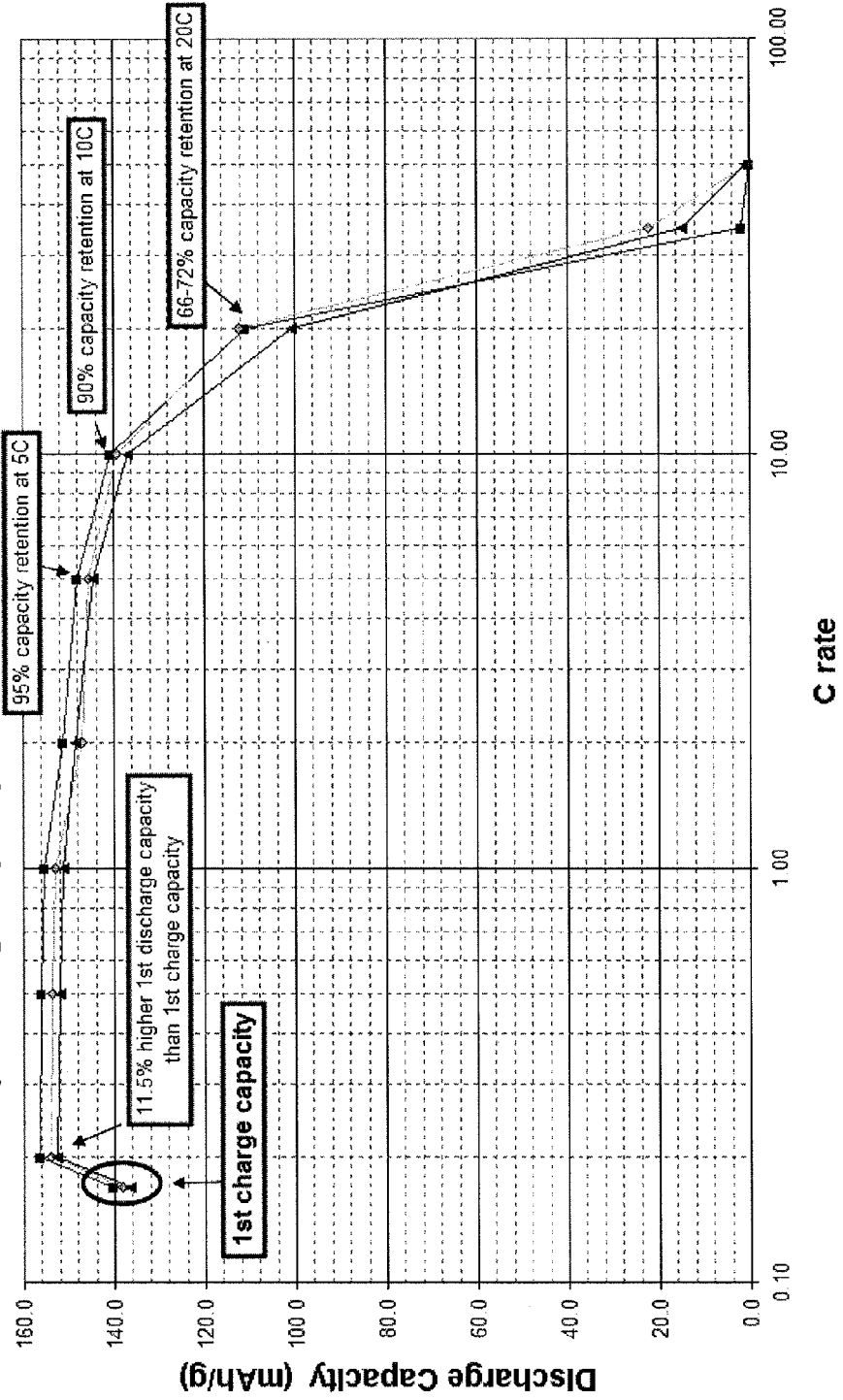
FIG. 5 is a plot of discharge capacity at various C-rates for the nanoscale lithium iron phosphate of Example 2; the plot includes the initial first charge capacity and illustrates that the first discharge capacity is more than 10% higher than the first charge capacity.

The existence of solid solution lithium deficiency is detectable as the appearance of a smaller total Li content that can be extracted from the nanocrystalline electrode upon first charging the cell, than can be re-inserted into the electrode upon discharging the cell. This difference in first-charge capacity compared to first-discharge or subsequent discharge capacity reveals the existence of lithium deficiency in the nanocrystalline material in its as-prepared state, and upon being assembled into a working cell. The extractable lithium is less than the amount of lithium that the same electrode can take up at saturation. FIG. 5 illustrates this behavior for a nanoscale lithium iron phosphate having the composition $Li_{0.99}FePO_4$ (Example 2). The initial data records the first charge capacity; subsequent data records discharge capacity at different c-rates. Note that first discharge at C/5 rate is more than 11% greater than initial capacity. Note also that >90% discharge capacity is maintained up to 10C, which represents a remarkably high capacity at high discharge rates. The tests are conducted at a sufficiently slow rate upon both charge and discharge, and over a similar voltage range, that the observed results reflect the capabilities of the storage material itself, rather than polarization or kinetic limitations due to the cell construction. Methods to ensure that such is the case are well-known to those skilled in the art.

Figure 6:
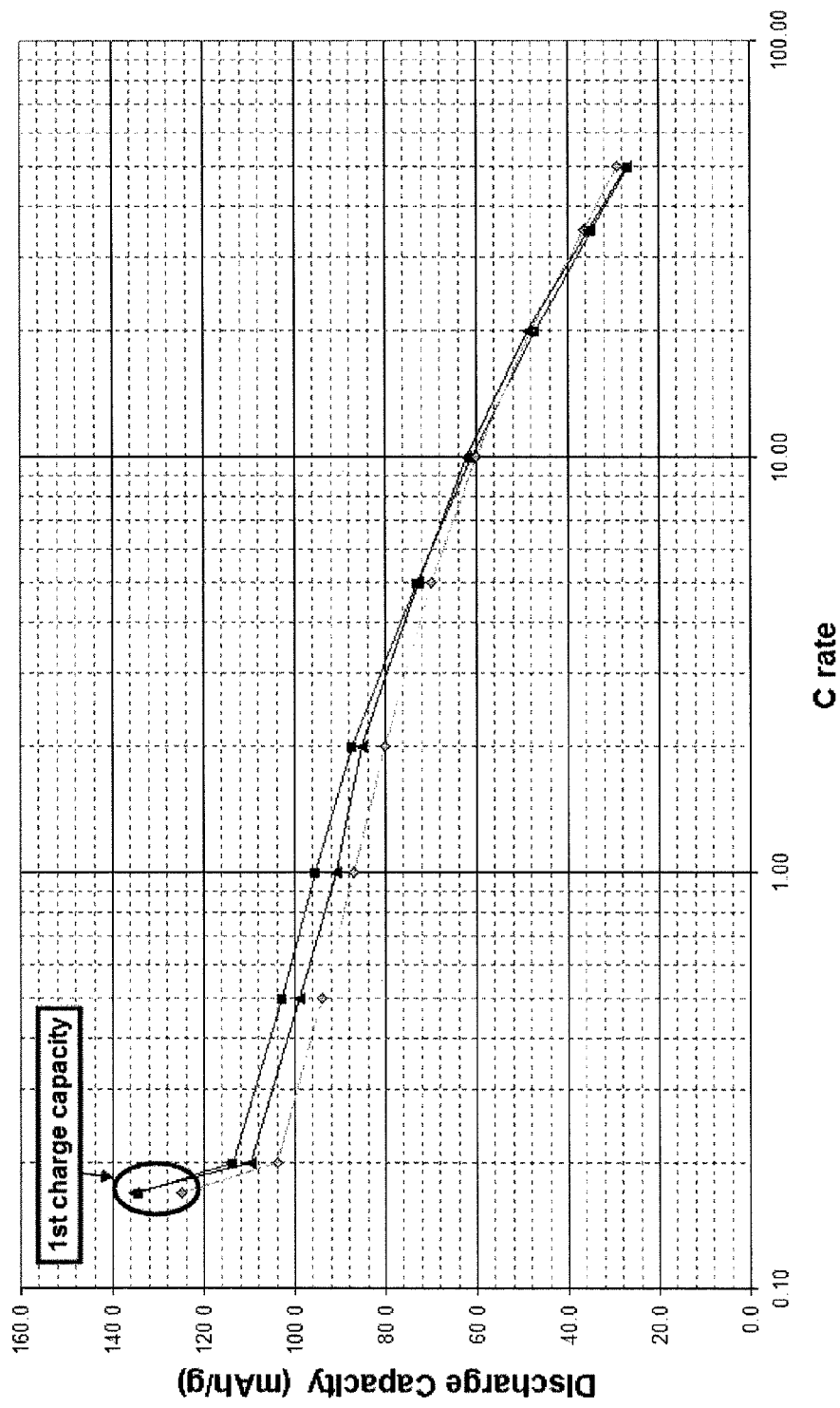
FIG. 6 is a plot of discharge capacity at various C-rates for a conventional coarse grained lithium iron phosphate; the material exhibits conventional first charge and discharge behavior and the plot shows a decrease in first discharge capacity compared to first charge capacity.

This behavior observed for nanocrystalline lithium iron phosphate is strikingly different from that of a conventional or coarse $LiFePO_4$, and indeed that of most insertion electrode materials. Such materials typically exhibit a first-charge capacity that is greater than the first- and subsequent discharge capacities using a similar cell configuration. Results from one comparative example are shown in FIG. 6. Comparison of this conventional material to the nanoscale material in FIG. 5 highlights some striking differences. First, discharge capacity at C/5 decreases by more than 10% from first charge capacity and the discharge capacity decreases steadily with increasing discharge rate.

The advantages imparted by a nanoscale material according to one or more embodiments of the present invention are counter-intuitive because a high, initial charge capacity is typically associated with a greater extractable lithium content. While it is generally desirable for a lithiated electrode material to have a higher initial extractable lithium content, in the present instance the ability of the nanoscale material to sustain a lithium-deficient solid solution confers various advantages as described herein, which may overcome the disadvantage of having slightly less lithium capacity.

Moreover, as discussed later, the nanoscale materials of the invention can sustain a nonstoichiometry x and y in the coexisting phase that may be as large or larger than the nonstoichiometry present in the as-made material. Thus preparation in an initially nonstoichiometric state is not required of the materials of the invention, nor necessary in order to obtain the benefits described herein.

Figure 19:
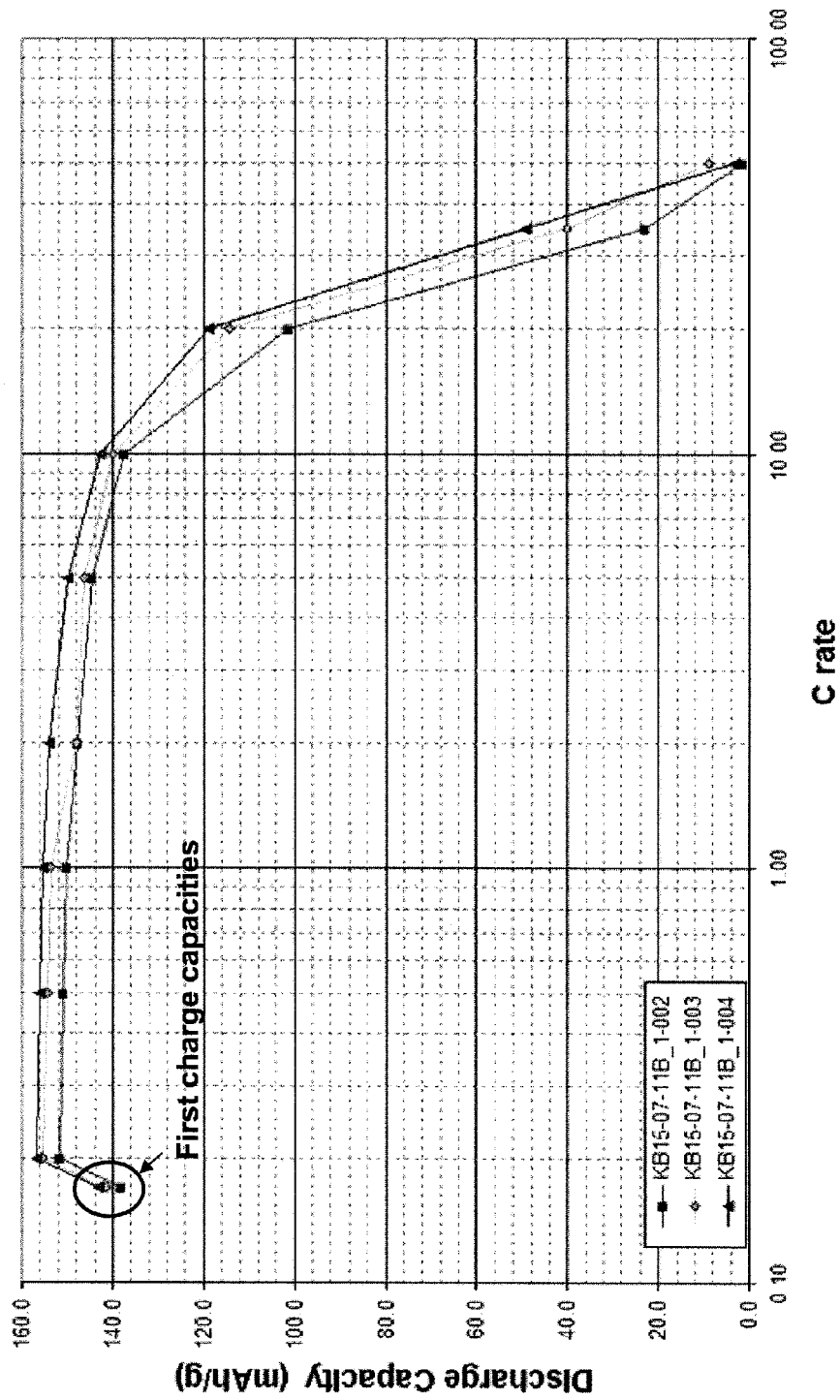
FIG. 19 shows test results from three lithium half-cells constructed using Swagelok® hardware as in Example 3.

As described previously, one aspect of the present nanoscale ion storage materials is the property, for an olivine compound that in bulk form has a very limited range of lithium solid solution in either its lithiated or delithiated form, to exhibit an increased solid solution range when produced in a nanoscale form. This is evidenced by the smaller first-charge capacity relative to the first- and subsequent discharge capacities of the material, e.g., as shown in FIGS. 5 and 19. In these instances, the lithium deficient solid solution clearly exists in the as-prepared material after heat treatment, and not only in the electrochemically cycled material, which as discussed previously also has an extended range of solid solution. Thus one aspect of the invention is a lithium metal phosphate material having an increased range of lithium nonstoichiometry in the as-synthesized state (prior to electrochemical use) due to the phenomenon of size-dependent nonstoichiometry. By lithium nonstoichiometry it is meant the extent to which a lithiated compound is deficient in lithium relative to the ideal composition, e.g., x in $Li_{1-x}FePO_4$ where the ideal composition is $LiFePO_4$, or the extent to which an as-prepared delithiated compound has an excess of lithium, e.g., $Li_yFePO_4$ where the ideal composition is $FePO_4$. Such compounds may have the olivine structure or some other crystalline structure, or may be amorphous or partially amorphous. The specific surface area of such a material may be at least 15 $m^2/g$, or more preferably at least 20 $m^2/g$, more preferably still at least 25 $m^2/g$, or more preferably still at least 30 $m^2/g$. The extent to which the lithium nonstoichiometry x or y is greater than that which occurs in an as-prepared material of the same composition but having a lower surface area form, e.g. less than about 10 $m^2/g$, may be at least 2 mole %, more preferably at least 4 mole %, and more preferably still at least 6 mole %. The extent of lithium nonstoichiometry can be measured by methods well-known to those skilled in the art including electrochemical titration measurements, X-ray or neutron diffraction measurements of lattice expansion and contraction due to the presence of nonstoichiometry, or chemical analyses. The presence of lithium nonstoichiometry in the starting material benefits the electronic conductivity and phase transformation rate of the material, and thus its performance in a lithium storage battery.

The ability of nanocrystalline materials as described herein to exist in a more highly nonstoichiometric or defective state than their coarse counterparts also can be demonstrated by measuring the equilibrium or near-equilibrium electrical potential of a nanoscale material relative to a standard or reference electrode in an electrochemical cell that allows electrochemical equilibration. It is well-known to those skilled in the art that the equilibrium electrical potential of such a cell, having one electrode whose potential is suitably well-referenced, can be used to determine the chemical potential of an electroactive species in the other, test electrode.

Figure 7:
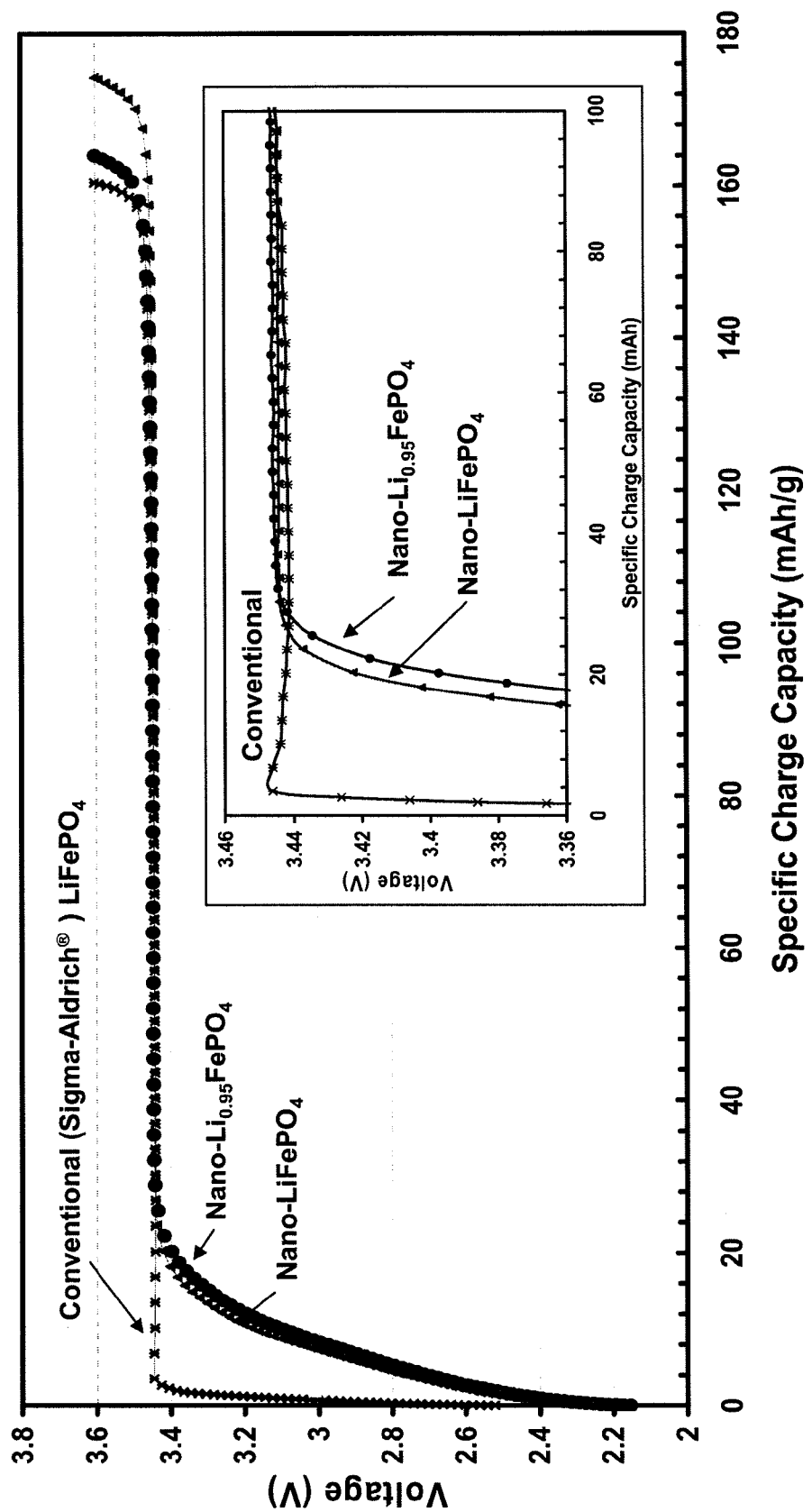
FIG. 7 is a plot illustrating the equilibrium or near-equilibrium electrical potential of a nanoscale $Li_{1-x}FePO_4$ ion storage material at a nearly fully lithiated composition, according to certain embodiments, relative to a standard or reference electrode in an electrochemical cell that allows electrochemical equilibration; an extended range of solid solution at room temperature in the nanoscale material is shown by a range of charge capacity, corresponding to regions of composition x, over which the open-circuit-voltage (OCV) varies continuously with composition, rather than being at a constant OCV.

FIG. 7 shows the cell voltage vs. specific capacity of the positive electrode active material for cells in which a lithium metal counterelectrode has been used, serving as a suitable reference. Two nanoscale lithium iron phosphate materials of overall compositions $LiFePO_4$ and $Li_{0.95}FePO_4$ are compared against a conventional, commercially available carbon-coated lithium iron phosphate. All three cells are tested at a slow C/50 rate permitting the near-equilibrium cell voltage to be observed. The nanoscale materials are further known from separate tests to exhibit much faster relaxation to their equilibrium potentials than does the conventional sample. It is seen that the nanoscale materials exhibit a substantial charge capacity over which the voltage varies continuously, before reaching a relatively constant voltage plateau. In contrast, the cell voltage for the conventional material exhibits no such regime, instead reaching its voltage plateau nearly immediately after a small voltage overshoot.

Figure 8:
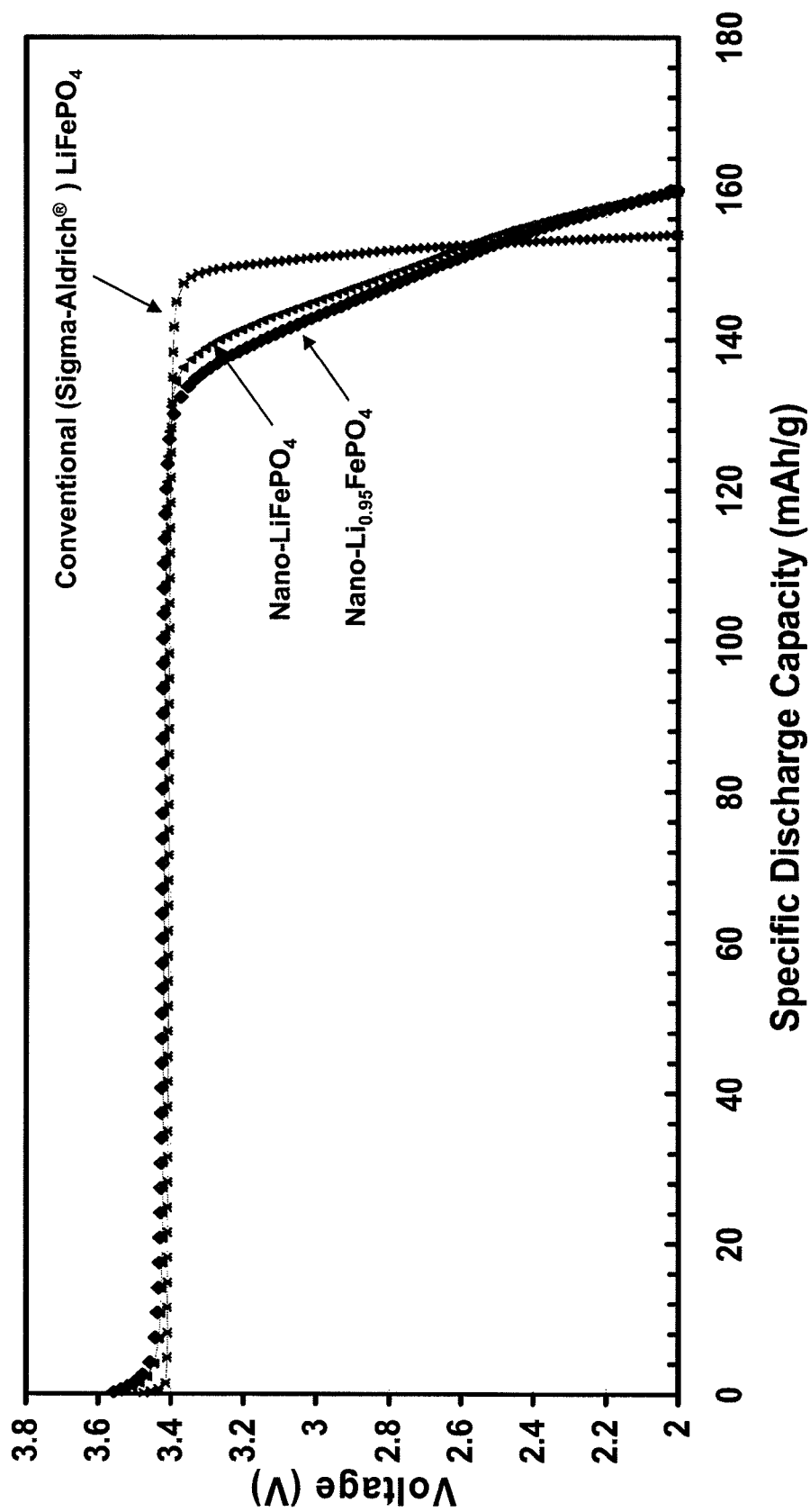
FIG. 8 is a plot illustrating the equilibrium or near-equilibrium electrical potential of a nanoscale $Li_yFePO_4$ ion storage material at a nearly fully delithiated composition, according to certain embodiments, relative to a standard or reference electrode in an electrochemical cell that allows electrochemical equilibration; an extended range of solid solution at room temperature in the nanoscale material is shown by a range of charge capacity, corresponding to regions of composition x, over which the open-circuit-voltage (OCV) varies continuously with composition, rather than being at a constant OCV.

FIG. 8 shows the C/50 discharge curves for the same three samples. Here it is seen that at the beginning of discharge the nanoscale materials both exhibit a capacity regime of continuously varying voltage, indicating the existence of a solid solution, that is essentially absent for the conventional material, and at the end of discharge, both nanoscale materials exhibit a wide capacity regime of continuously varying voltage indicating a solid solution. These examples demonstrate the effect pictorially illustrated in FIGS. 3B and 4B for nanoscale and conventional lithium iron phosphate materials, respectively.

Other accepted electrochemical methods that can be used to show that the nanoscale materials of the invention possess regimes of extended solid solution include GITT and PITT. In GITT, the open-circuit-voltage (OCV) measured after allowing an electrochemical cell to approach equilibrium will exhibit a composition dependence (i.e., as a function of state-of-charge or charge capacity) that is measurably different between the conventional and nanocrystalline forms. An extended range of solid solution in the nanoscale material is shown by regions of composition x over which the OCV varies continuously with composition, rather than being at a constant OCV. This indicates a constant chemical potential for lithium despite variation of x, corresponding to a multiphase equilibrium. Such measurements typically can be conducted to ±0.002V or better precision by those skilled in the art, allowing comparison of different materials to determine the value of x at which the boundary between a single-phase solid solution and multiple phases lies. For a nanoscale material, there is a wider range of composition x over which the single-phase solid solution can exist. The wider range of solid solution in the nanoscale form can be attained for any one or more of the individual phases exhibited by the compound, including intermediate phases forming within the limits of lithiation discussed here.

Figure 9:
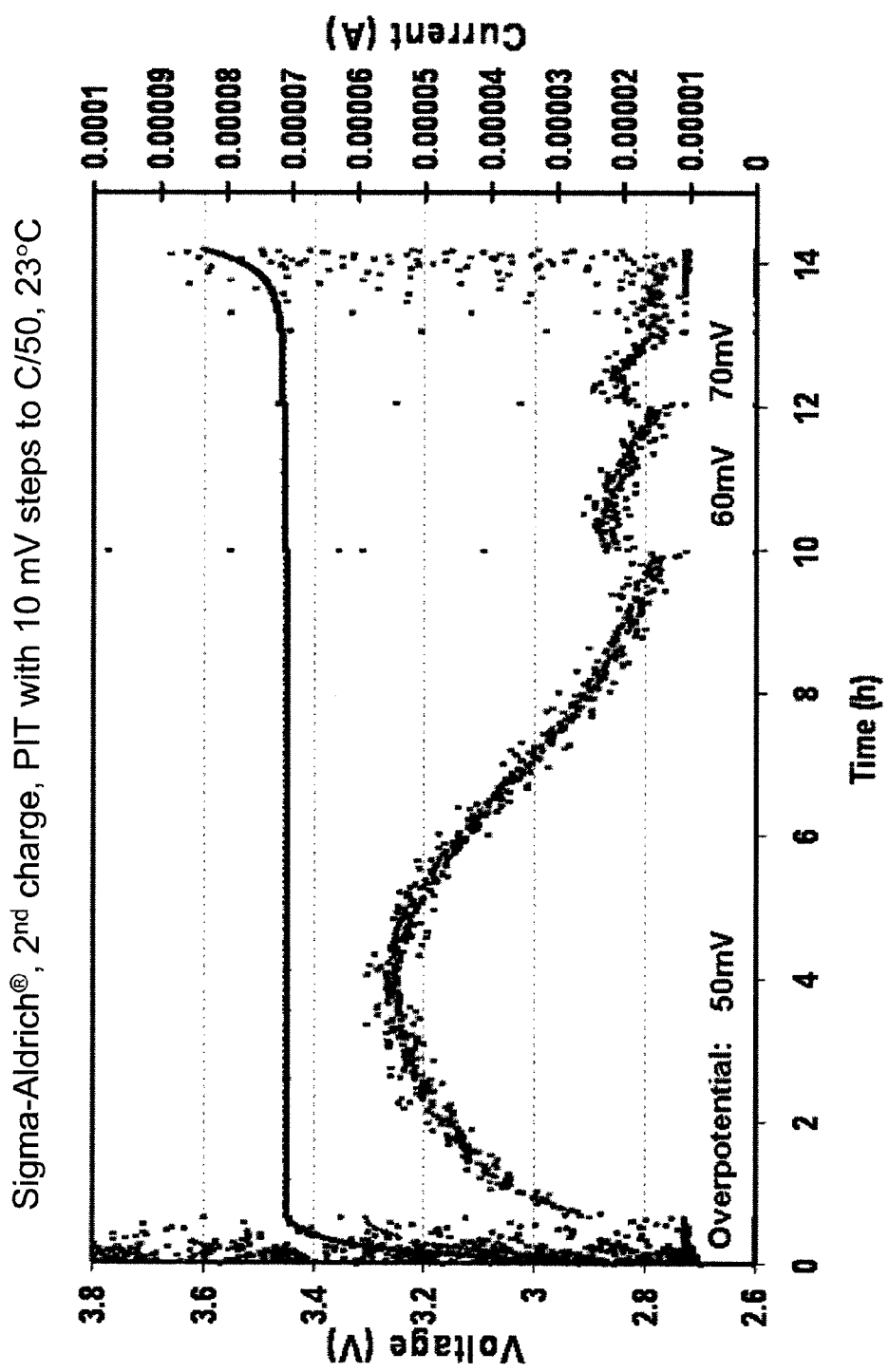
FIG. 9 shows the voltage and current traces upon charging in a PITT measurement of a conventional carbon-coated lithium iron phosphate sample.
Figure 10:
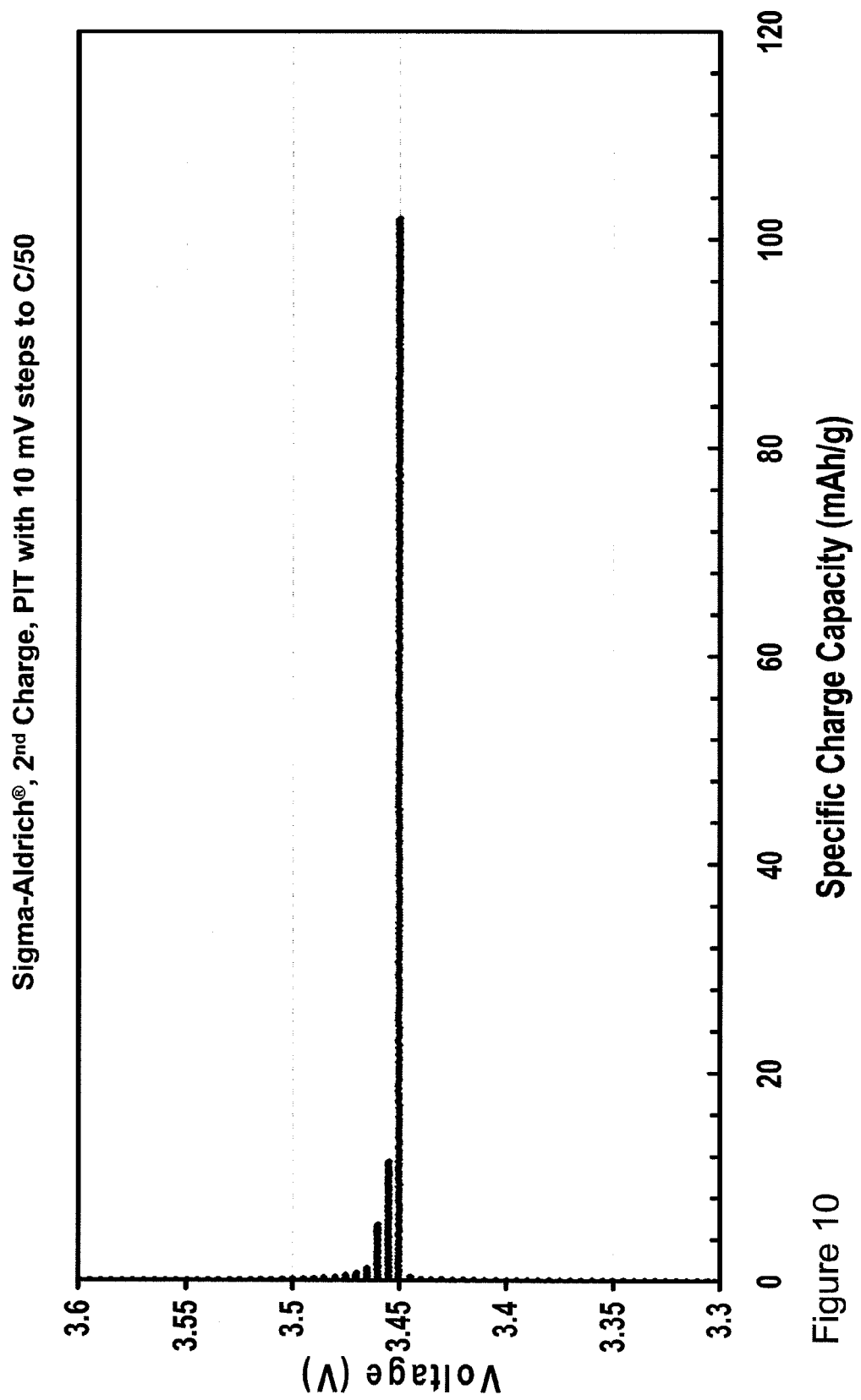
FIG. 10, shows the capacity the cell of FIG. 9 at each voltage step during the PITT charging experiment; virtually no capacity is recorded as the voltage is raised until a large capacity is observed at the plateau voltage.
Figure 11:
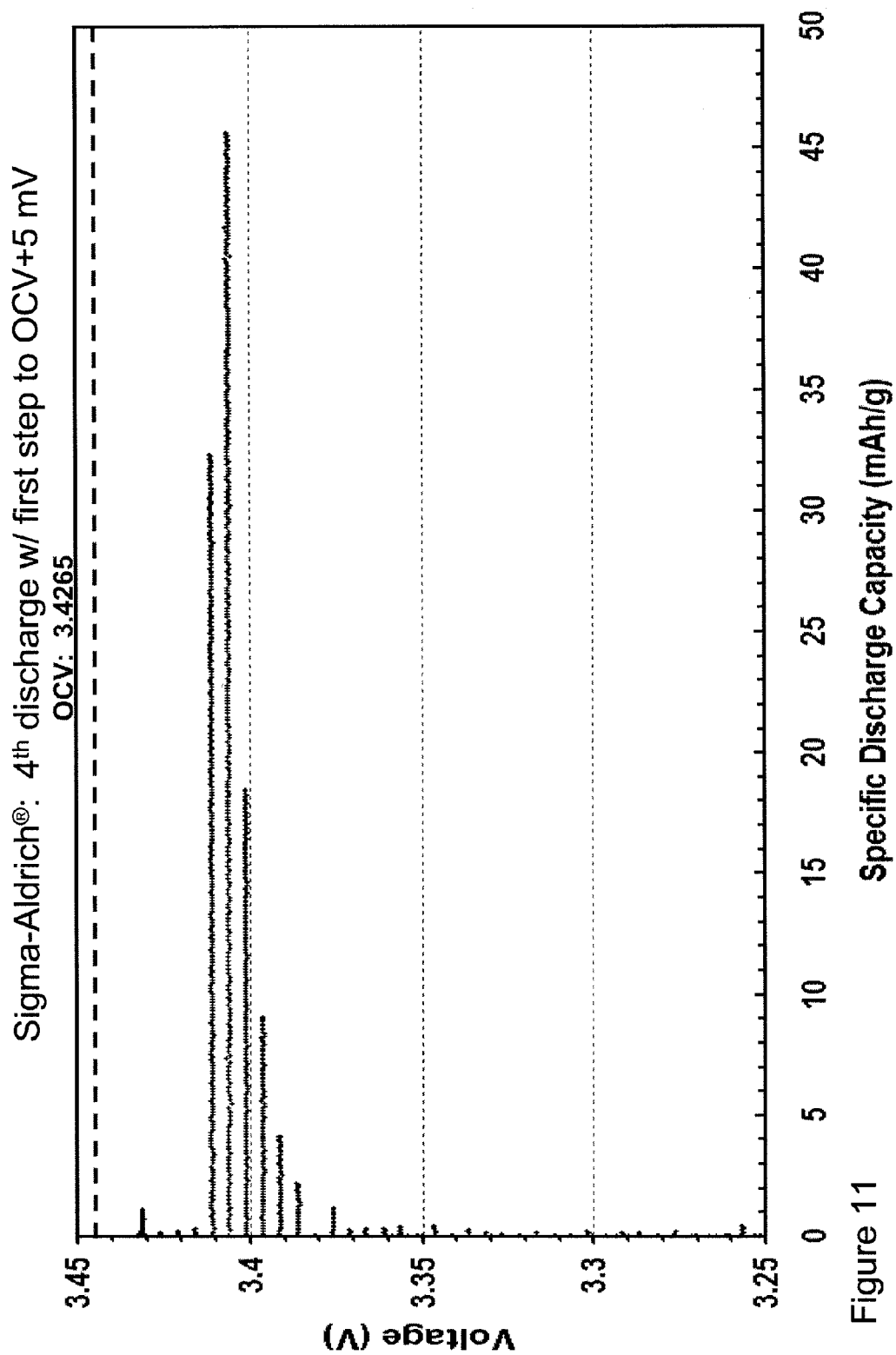
FIG. 11 illustrates a PITT discharging experiment for the cell of FIG. 9 in which the first voltage step was from a charge voltage of 3.8V to a voltage that is 5 mV above the open-circuit voltage of the cell, measured at a 50% state-of-charge; virtually no discharging of the cell is seen until the PITT voltage is about 20 mV below the OCV.

The PITT method is also useful for not only determining the cell voltages at which electrochemical oxidation and reduction of an electrode-active compound occur, but also for providing information regarding the rate and mechanism of such reactions. In PITT, the cell voltage is stepped upwards or downwards incrementally, and the current flow is monitored as the cell spontaneously charges or discharges. FIG. 9 shows the voltage and current traces upon charging in a PITT measurement of a conventional carbon-coated lithium iron phosphate sample. With each incremental voltage step of 10 mV, the current is observed to flow as the cell undergoes charging. It is notable that virtually no capacity is recorded until a voltage plateau is reached. Also, during charging on the voltage plateau, the current flow rises slowly over a period of several hours and then decays, showing sluggish kinetics for the phase transformation occurring during charging. In FIG. 10, the capacity measured for the cell at each voltage step during the PITT charging experiment is shown. It is seen that virtually no capacity is recorded as the voltage is raised until a large capacity is observed at the plateau voltage. In FIG. 11 are shown results for the same cell during a PITT discharging experiment in which the first voltage step was from a charge voltage of 3.8V to a voltage that is 5 mV above the open-circuit voltage of the cell, measured at a 50% state-of-charge. In this experiment, virtually no discharging of the cell is seen until the PITT voltage is about 20 mV below the OCV.

Figure 12:
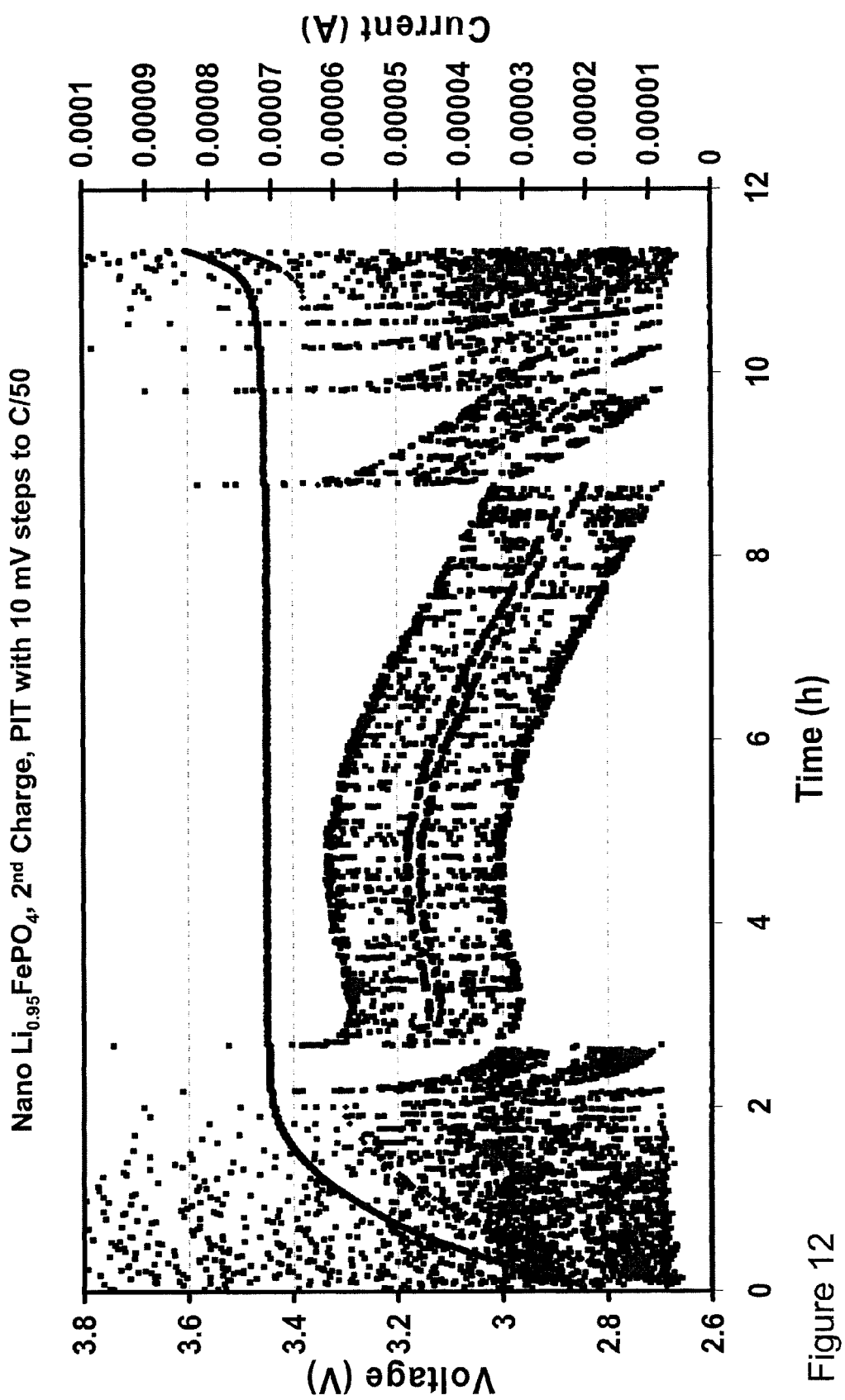
FIG. 12 shows a charging PITT experiment on a nanoscale $Li_{0.95}FePO_4$ material, in which substantial current flow, indicating charging, is seen well before the two-phase plateau voltage is reached.
Figure 13:
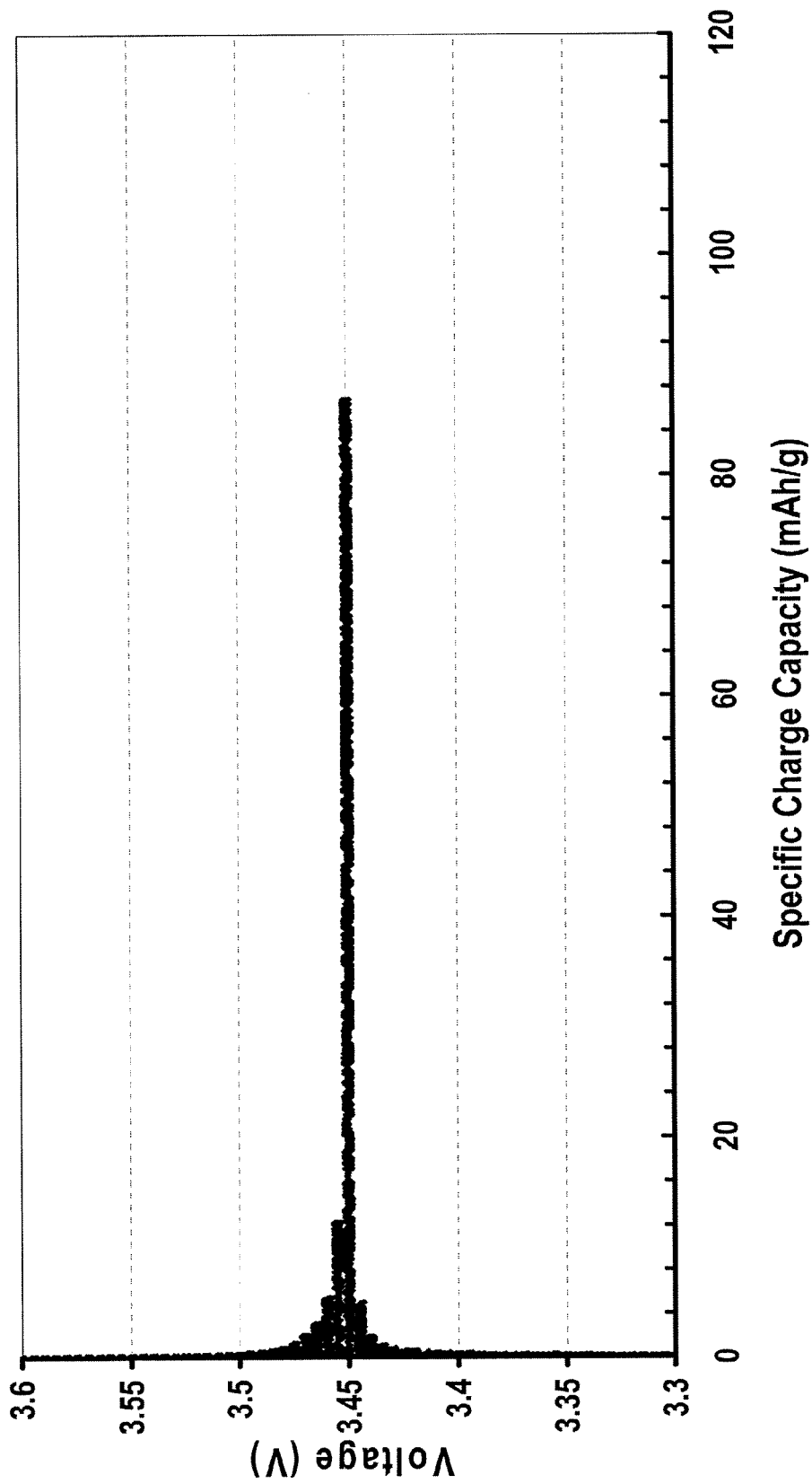
FIG. 13 shows the capacity measured for the cell of FIG. 12 at each voltage step during the PITT charging experiment.
Figure 14:
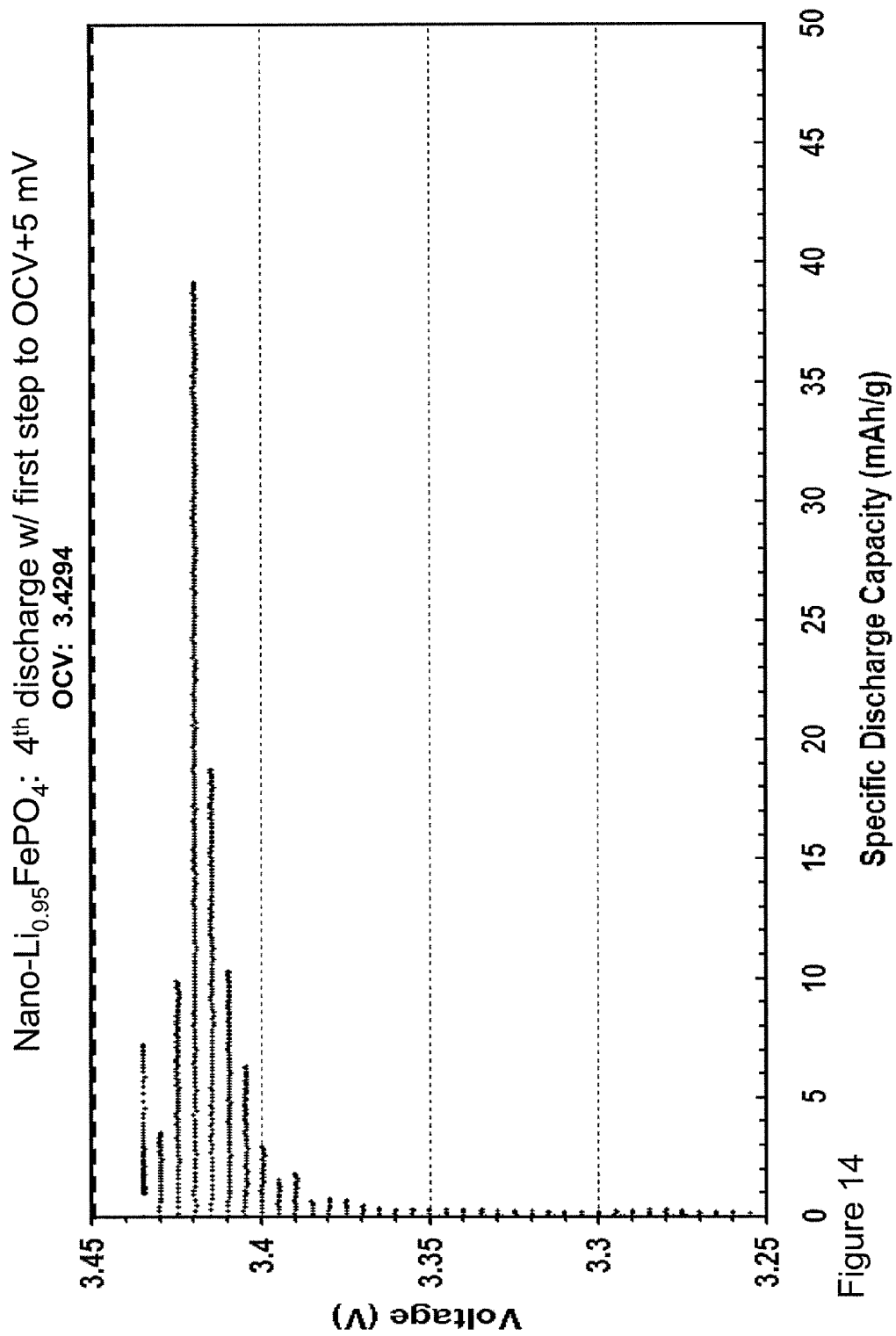
FIG. 14 shows a PITT discharging experiment for the cell of FIG. 12, in which the first voltage step was from a charge voltage of 3.8V to a voltage that is 5 mV above the open-circuit voltage of the cell, measured at a 50% state-of-charge; a substantial capacity of about 8 mAh/g is measured when the PIT voltage is still 5 mV above the OCV.

The nanoscale materials of the invention behave in markedly different manner. FIG. 12 shows a charging PITT experiment on a nanoscale $Li_{0.95}FePO_4$ material, in which substantial current flow, indicating charging, is seen well before the two-phase plateau voltage is reached. In addition, with each upward voltage step, the maximum in current is observed immediately, rather than several hours into the current decay process as seen in FIG. 9. This shows that the phase transformation forming the delithiated $Li_yFePO_4$ phase is more facile in the nanoscale material. FIG. 13 shows the capacity measured for the cell at each voltage step during the PITT charging experiment. It is seen that there is substantial charging occurring below the plateau voltage. Note that because charging can only occur when the applied voltage is equal to or greater than the equilibrium voltage, this result shows that there exist compositions with an equilibrium voltage below that of the two-phase plateau. That is, it demonstrates the existence of a lithium-deficient solid solution $Li_{1-x}FePO_4$. In FIG. 14 are shown results for this same cell during a PITT discharging experiment in which the first voltage step was from a charge voltage of 3.8V to a voltage that is 5 mV above the open-circuit voltage of the cell, measured at a 50% state-of-charge. Here, a substantial capacity of about 8 mAh/g is measured when the PITT voltage is still 5 mV above the OCV. Since upon discharge, no driving force exists until the applied voltage is at or below the equilibrium voltage, this result demonstrates the existence of a lithium excess solid solution $Li_yFePO_4$ at voltages above the plateau voltage.

The differences between nanoscale $Li_{1-x}FePO_4/Li_yFePO_4$ and the conventional materials can also be quantified by X-ray diffraction. The presence of a compositionally distinct nonstoichiometry in nanoscale $Li_{1-x}FePO_4$ is demonstrated by unique lattice constants (a, b and c within the orthorhombic unit cell) and unique unit cell volume (given by the product a×b×c). Conventional crystalline olivine LiFePO$_4$ has a larger a and b lattice parameter, and a smaller c lattice parameter, than does crystalline FePO$_4$. A continuous solid solution between LiFePO$_4$ and FePO$_4$ would therefore show a continuous variation between the limiting values of the lattice constants as the lithium concentration varies between one and zero. The lattice constants of the materials according to one or more embodiments of the invention may therefore be used to determine the corresponding nonstoichiometry of the coexisting phases. This was accomplished by carrying out careful X-ray diffraction measurement of the subject materials at different states of lithiation (different states of charge, SOC), from which lattice parameters and other crystallographic information was obtained using Rietveld refinement, a process for analyzing diffraction data that is well-known to those skilled in the art of battery materials synthesis and characterization.

Figure 15:
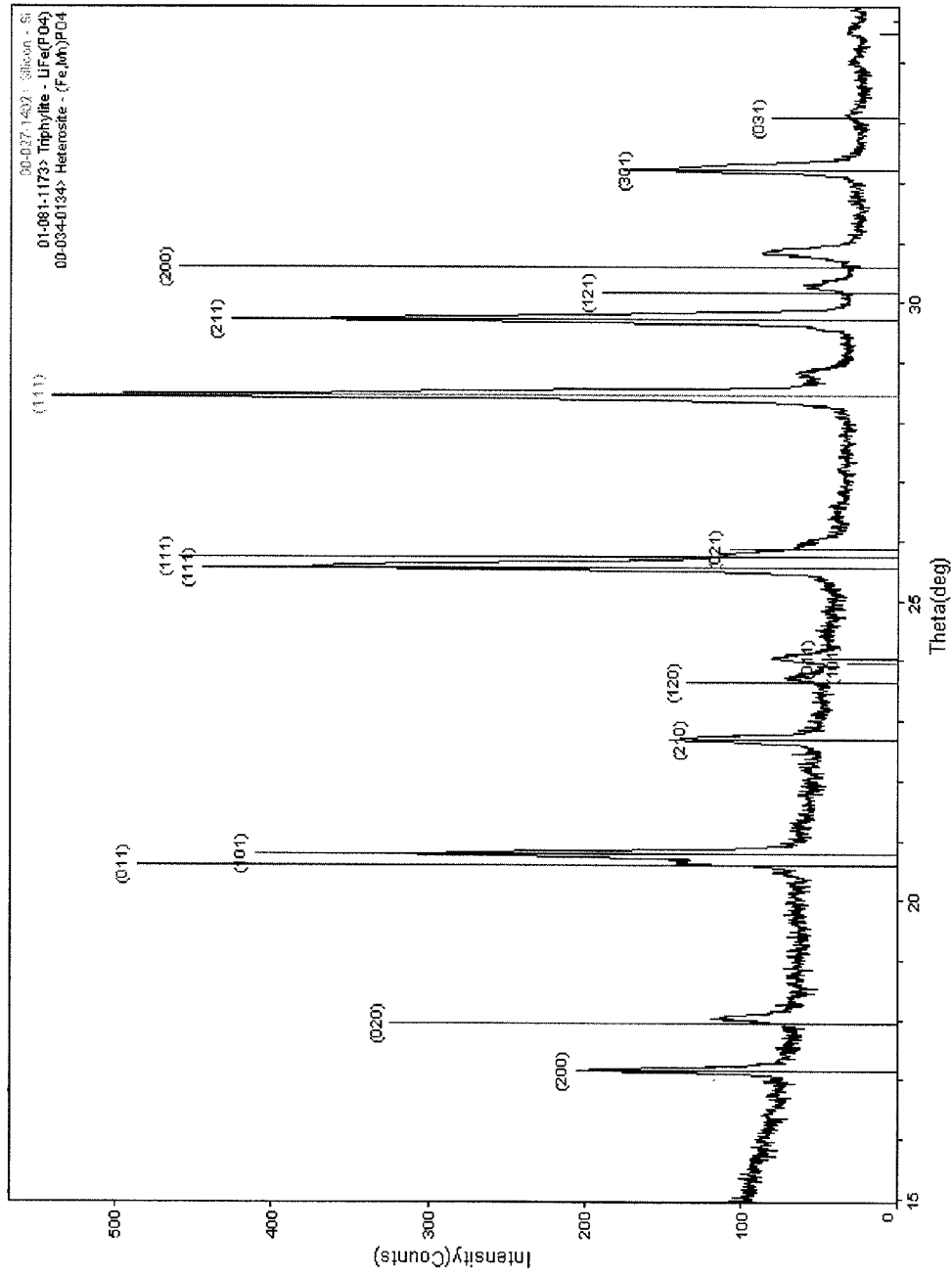
FIG. 15 shows a powder X-ray diffraction pattern obtained from a conventional carbon-coated lithium iron phosphate material at 50% SOC.

FIG. 15 shows a powder X-ray diffraction pattern obtained from a conventional carbon-coated lithium iron phosphate material (Sigma-Aldrich® Chemical) at 50% SOC. To this sample was added silicon powder to provide an internal standard for the X-ray peak positions. It is seen that the peaks for LiFePO$_4$ olivine are well aligned with the expected peak positions for this phase, based on the data in reference 01-081-1173 from the Joint Committee on Powder Diffraction Standards (JCPDS). The peaks for the olivine form of FePO$_4$ are also seen in FIG. 15, and are somewhat displaced from the positions for a somewhat different composition listed by JCPDS.

Figure 16:
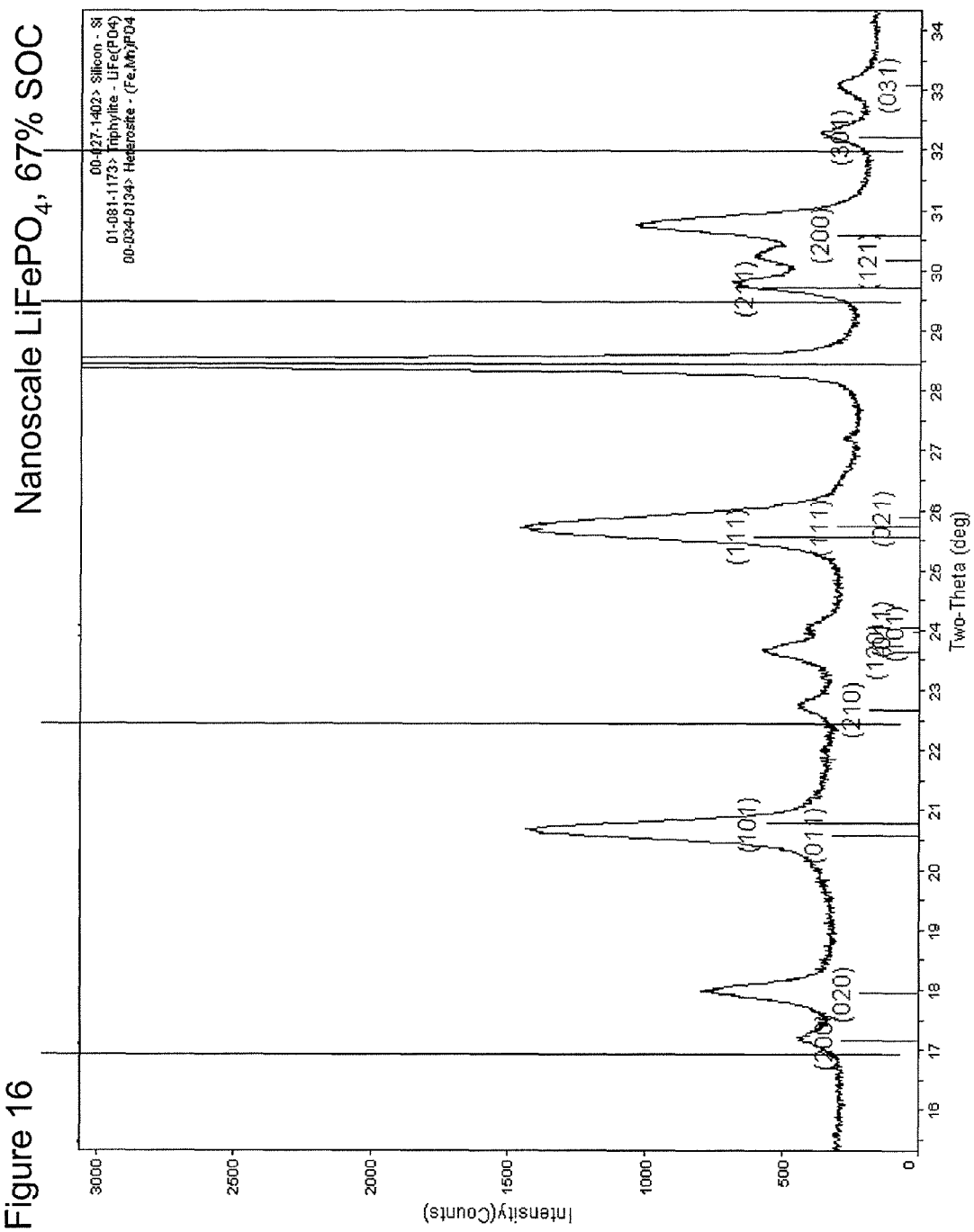
FIG. 16 shows the powder X-ray diffraction pattern obtained from a nanoscale $LiFePO_4$ sample according to the invention, measured at 67% SOC.

FIG. 16 shows the powder X-ray diffraction pattern obtained from a nanoscale LiFePO$_4$ sample according to the invention, measured at 67% SOC. It can be seen that numerous peaks for both the "LiFePO$_4$" and "FePO$_4$" phases are displaced from their corresponding positions in FIG. 15. A precise determination of the lattice constants in these materials was made using the Rietveld refinement method, on powder X-ray diffraction spectra carefully obtained over a wide diffraction angle range (known to those skilled in the art as the "2-theta" range) of 15 degrees to 135 degrees. It was found that the nanoscale materials according to one or more embodiments of the invention, when in a state of charge such that the above mentioned two olivine phases co-exist, have distinctly different lattice parameter values from the conventional material. The lattice parameters and unit cell volumes are reported in Table 1, in which the nanoscale lithium iron phosphate was measured at 67% state-of-charge, compared with similar measurements made for a conventional LiFePO4/FePO4 reported in the literature (A. S. Andersson and J. O. Thomas, J. Power Sources, 97-98: 498 (2001)). For example, on the lithium rich side of the phase diagram, nanoscale Li$_{1-x}$FePO$_4$ having smaller a and b lattice constants and a larger c lattice constant for than conventional LiFePO$_4$ are obtained. The lithium deficient solid solution coexists with an Li$_y$FePO$_4$ phase having the lattice parameters for a, b that are larger and c that is smaller than in conventional FePO$_4$. These measurements show that indeed x and y are larger than their corresponding values in conventional LiFePO$_4$/FePO$_4$, notwithstanding some smaller nonstoichiometry existing in those materials as well. From the Rietveld refinement of the nanoscale sample, a crystallite size of about 28 nm was determined, which is close to the calculated equivalent spherical particle size of 36.1 nm and shows that the high surface area of the sample is due to nanoscale crystallites of the lithium iron phosphate and not due to a high surface area impurity or additive phase.

TABLE 1

Lattice constants and unit cell volume for LiFePO$_4$, FePO$_4$, Li$_{1-x}$PO$_4$ and Li$_y$FePO$_4$

| Material | a (Å) | b (Å) | c (Å) | Unit cell volume (Å$^3$) |
|---|---|---|---|---|
| LiFePO$_4$ | 10.329 | 6.007 | 4.691 | 291.02 |
| Li-deficient Li$_{1-x}$FePO$_4$ | 10.288 | 5.991 | 4.698 | 289.56 |
| FePO$_4$ | 9.814 | 5.789 | 4.782 | 271.7 |
| Li-rich Li$_y$FePO$_4$ | 9.849 | 5.809 | 4.781 | 273.55 |

The existence of larger nonstoichiometry in the coexisting phases of the materials of the invention is therefore readily measured using diffraction methods. The value of x and y determines the ratio of 2+ to 3+ transition metal valences (in the case of iron, it is Fe$^{2+}$/Fe$^{3+}$) in the materials, and larger values correspond to a higher concentration of the minority valence state. This has the effect of increasing the electronic conductivity of each phase compared to the same phase in its conventional state of lower x or y, and thereby improves electrochemical performance of the battery. In addition, a reduction in the lattice parameter of the Li$_{1-x}$FePO$_4$ phase (or any other compositions of the lithium-rich end member) has the effect of bringing the multivalent transition metal ions closer together within the structure, which also increases the degree of orbital overlap thereby changing the electronic structure of the material so as to decrease the bandgap or increase carrier mobility, thereby increasing electronic conductivity.

The a, b lattice constants for the lithium deficient Li$_{1-x}$FePO$_4$ is less than that for LiFePO$_4$ and the a, b lattice constants for the lithium rich Li$_y$FePO$_4$ is greater than that for FePO$_4$. Therefore, the mismatch in lattice parameters and unit cell volume is decreased in the nanoscale materials of the invention, which may have a profound influence on the electrochemical performance of the material, particularly at high charge/discharge rates. This is because the facility with which one phase is formed from the other upon charging and discharging of the electrochemical cell is dependent on the mismatch in lattice parameters (if crystalline) and the relative volumes of the two co-existing phases.

The lattice parameters and unit cell volume between the coexisting phases Li$_{1-x}$FePO$_4$ And Li$_y$FePO$_4$ and the unit cell volume are reported in Table 1. From these values, one may readily compute the differences in lattice parameters and in unit cell volumes, on a percentage basis, for a transformation from the Li$_{1-x}$FePO$_4$ to Li$_y$FePO$_4$ phase, which corresponds to charging of a cell using the lithium iron phosphate as the positive electrode, or from Li$_y$FePO$_4$ to Li$_{1-x}$FePO$_4$, which corresponds to discharging. The percentage changes upon charging are found to be slightly smaller than those upon discharging, and this may cause differences in the inherent rate of charging versus discharging within any one material. However, to facilitate comparison of the nanoscale and conventional materials, we may also compute the differences in the respective values of any lattice constant or unit cell volume as a percentage of the mean value between the two, as has been done in Table 2. That is, the percentage difference in the a lattice constant is the difference in a between any two materials divided by the arithmetic mean value of a for those two samples. Herein, unless otherwise stated, the percentage differences are computed in this manner. For nanoscale Li$_y$FePO$_4$/Li$_{1-x}$FePO$_4$ the differences in lattice parameters are Δa=4.36%, Δb=3.07%, Δc=−1.75%, and the difference in unit cell volume is ΔV=5.69%. In comparison, for conventional LiFePO$_4$/FePO$_4$, the corresponding numbers are Δa=5.11%, Δb=3.68%, Δc=−1.93%, and ΔV=6.87% for the limiting endmembers. We also measured a conventional material (Sigma-Aldrich® Chemical) that was taken to 50% state-of-charge, and in which the co-existing compositions have the small permitted extent of nonstoichiometry. Here the difference is Δa=4.91%, Δb=3.64%, Δc=−2.03%, and ΔV=6.52%. These unit cell and lattice parameter differences are summarized in Table 2.

Although not shown in Table 2, one may also readily compute the misfit strain of a plane separating the two limiting compositions $Li_yFePO_4$ and $Li_{1-x}FePO_4$. This is important because the formation of one phase from the other during electrochemical cycling must necessarily introduce an interface between the two materials, which is a two-dimensional feature. Inspection of the results in Table 1 shows that the plane formed by the principal axes a and b (the ab plane or in Miller indices the {110} plane) have the largest difference in area between the $Li_yFePO_4$ and $Li_{1-x}FePO_4$, the ac plane (or {101}) has the next largest difference, and the bc plane (or {011} has the least difference. This indicates that the bc plane is the most preferred orientation along which one phase will grow topotaxially upon the other (or vice versa). Comparing the nanoscale and conventional materials in Table 1, these differences are 7.43%, 2.62% and 1.32% respectively for the nanoscale material, and 8.79%, 3.19%, and 1.76% respectively for the conventional material. In the Sigma-Aldrich® material measured at 50% SOC these differences are 8.55%, 2.88% and 1.62% respectively. Thus, according to one embodiment, the nanoscale materials of the invention are defined by having a plane formed by any of the principal axes of the crystal along which the strain measured as a change in the area is less than about 1.6%, or less than about 1.5%, or less than about 1.4%. According to another embodiment, none of the planes formed by any of the principal axes of the crystal have such a strain exceeding 8%, or 7.5%, or 6%.

TABLE 2

Lattice parameter and unit cell data

| Material | Δ a (%) | Δ b (%) | Δ c (%) | Δ V (%) |
|---|---|---|---|---|
| $LiFePO_4$ | 5.11 | 3.68 | −1.93 | 6.87 |
| $FePO_4$ | | | | |
| Li-deficient nano $Li_{1-x}FePO_4$ | 4.36 | 3.07 | −1.75 | 5.69 |
| Li-rich nano $Li_yFePO_4$ | | | | |
| $Li_{1-x}FePO_4$ (conventional) | 4.91 | 3.64 | −2.03 | 6.52 |
| $Li_yFePO_4$ (conventional) | | | | |

These differences between the nanoscale and conventional materials are significant, due to the fact that the elastic moduli of these inorganic compounds are very high, e.g., on the order of 100 GPa. Small percentage differences in lattice parameters and unit cell volumes result in large elastic energies if these highly stiff solids are made to accommodate the strains without breaking apart. By engineering the nanoscale material of the invention to have small differences in lattice parameters and unit cell volumes between coexisting phases, not only is the energy required to transform one phase from the other decreased, the likelihood of mechanical fracture and defect formation during cycling, so-called "electrochemical grinding," is minimized, leading to an exceptionally long cycle life for the materials of the invention.

It is also recognized that while there is a limiting particle size above which the benefits seen in the materials of the invention are no longer realizable, it is expected that there is virtually no practical lower limit to the particle sizes that may be obtained through synthesis methods known to those skilled in the art. As the particle size of the nanoscale materials of the invention decrease, the extent of nonstoichiometry x and y under any given synthesis or test conditions increases, and the differences in lattice constants and unit cell volumes between the coexisting phases decreases as well. That is, referring to FIG. 4, the boundaries of the two-phase regime move inward in composition and down in temperature. For sufficiently fine particle sizes, a complete solid solution becomes achievable at room temperature.

The cycle life of a rechargeable battery is typically defined as the number of charge/discharge cycles, over a specified voltage range and at a specified current rate, over which the capacity of the battery decreases to a certain percentage of the initial value. Conventional cathode-active materials and rechargeable batteries using these materials, including $LiFePO_4$ olivine and its compositional derivatives, over a voltage range of about 2V to 3.8V and at a current rate of about 1C, typically show a cycle life of less than 1000 cycles before the capacity decreases to 80% of its initial value. In contrast, the materials and devices of the invention can undergo in excess of 1000, even in excess of 2000, and in some instances in excess of 5000 cycles before decreasing in capacity by this amount. At higher charge discharge rates, for example a 5C charge/discharge rate over the same voltage range, conventional materials will typically show a cycle life of less than about 500 cycles before decreasing in capacity to 80% of the initial value. In contrast, the materials and devices according to one or more embodiments of the invention may exhibit greater than 1000 full charge/discharge cycles before decreasing in capacity by this amount.

Many applications of a high power battery, including but not limited to hybrid electric vehicle applications, require high rate charge/discharge pulses over a narrower range of voltage or capacity than full cycling. Under such conditions, the cycle life of the materials and devices of the invention can be extraordinarily long. One well-known pulse testing protocol is the "HPPC" test defined by the United States Advanced Battery Consortium (USABC). The materials of the invention, when used in a battery meeting the specific energy and specific power requirements defined by the USABC, are able to exhibit in excess of 150,000 of cycle life before the performance of the battery falls below the defined useful limits.

It is understood that during the dynamic process of lithium intercalation and deintercalation, the stresses generated by the differences in lattice parameters can cause the unit cell parameters and corresponding compositions x and y of the coexisting phases to temporarily deviate from their stable values. Nonetheless, upon allowing some time for stress relaxation and local equilibration within the materials, the above described differences between nanoscale and conventional materials are seen, thereby clearly distinguishing the two classes of materials from each other. The properties of the materials including the lithium nonstoichiometry may not yet be at their stable state when first preparing a material and assembling an electrochemical device. In use as a reversible electrochemical device such as a rechargeable battery, the behavior of the material during the very first cycle may not be as important as the behavior during subsequent cycling. Therefore the differences in unit cell parameters and lithium concentrations desirably are measured after at least one full intercalation and deintercalation cycle between the working voltage limits of the device, and after allowing said material to rest in its state-of-charge for at least 12 hours. According to one or more embodiments of the present invention the extent of solid solution in each end member phase may increase with electrochemical cycling, allowing the transformation from one phase to the other to become more facile with the use of the battery. This is manifested in, amongst other behavior, as a decrease in the impedance of the battery with charge/discharge cycling.

In the materials according to one or more embodiments of the invention, the formation of one phase from the other (and vice versa) upon electrochemical cycling is made much more facile in comparison to previous materials by the fact that the materials are nanoscale, and because they have been engineered to have smaller lattice parameter and unit cell mismatch between the two co-existing phases. The advantages of minimizing the mismatch stresses in order to permit facile phase transitions and high rates of charge and discharge have not previously been recognized in the field of battery materials.

Conventional understanding also teaches away from the use of high surface area active materials in battery electrodes, especially on the positive electrode side, for several reasons, such as poor safety, excessive self-discharge, rapid impedance buildup over time, or shortened cycle life at elevated temperatures, or low tap density and packing density resulting in undesirably low energy density in fabricated batteries. For example, it is well-known that the cathode active materials $LiCoO_2$ and $LiNiO_2$, including their solid solutions and derivatives, can create unsafe conditions in the highly charged state due to the presence of their transition metals in the highly oxidized 4+ valence state. Overcharged and/or overheated lithium ion cells using these cathode materials, even in conventional form, can exhibit thermal-runaway leading to fire or explosion, and it is generally considered to be the case that such risks are exacerbated by the use of higher surface area active materials. Also, at elevated temperatures and over long operating times, lithium ion cells using these cathode materials exhibit impedance rise due to interfacial reactions, which lowers the power capability. Thus, the use of these materials in a nanocrystalline state generally is considered unwise for both safety and life reasons. As another example, the cathode active material $LiMn_2O_4$ has been used in high power lithium ion batteries, but frequently exhibits permanent capacity loss after use or storage, related to the dissolution of manganese in the electrolyte and/or protonation of the surface of the active material particles by residual acid in the liquid electrolytes used in such cells. Since these effects are exacerbated in high surface area materials, common knowledge teaches away from the use of nanocrystalline $LiMn_2O_4$. These observations suggest that nanoscale particle sizes could be undesirable with respect to certain properties. However, using the nanoscale ion storage materials described herein, such difficulties can be overcome while retaining energy density and power density advantages.

The surprisingly wider range of solid solution of the nanoscale materials of the invention compared to their conventional counterparts may be due to stress, both the stress exerted by the highly curved free surface combined with the surface tension of the material, and the stress induced when the two phases coexist and a region of each phase each exerts a stress on a region of the other phase. In addition, while not being bound by any particular interpretation, it is believed that differences in the properties of the nanoscale ion storage materials described herein compared to their conventional larger scale counterparts are also due to the formation of near-surface defect layers that alter the overall defect thermodynamic state of the material. The differences in physical properties and structure between the nanoscale and conventional crystalline states can be likened to the difference between the crystalline and glassy forms of a single composition, which have such clearly different thermodynamic, structural and physical properties as to be considered different materials.

While not being bound by any mode or theory of operation, the following mechanisms may provide a basis for unique properties of the nanocrystalline materials according to one or more embodiments of the present invention. In ion-covalent compounds having a lattice discontinuity, such as a free surface or grain boundary, due to differences in the free energies of formation of lattice defects, the surface can become enriched in one or more atomic species relative to others. This gives rise to an excess surface charge, and a compensating space-charge layer that penetrates a short distance into the solid, the space-charge layer being composed of charged defects. When the space-charge defects are vacancies, the bulk of the crystal then has an overall excess of the vacancies, namely an altered stoichiometry compared to the ideal crystal in the absence of the surface or interface. The space-charge phenomenon is well-established in ionic crystals through many theoretical and experimental studies, including papers published by one of the inventors. (See, e.g., Y.-M. Chiang, D. P. Binie, III, and W. D. Kingery, *Physical Ceramics: Principles for Ceramic Science and Engineering*, Chapter 3, John Wiley & Sons (1997); Chiang et al., "Characterization of Grain Boundary Segregation in MgO," *J. Am. Ceram. Soc.*, 64:383-89 (1981); Ikeda et al., "Space Charge Segregation at Grain Boundaries in Titanium Dioxide: Part I, Relationship Between Lattice Defect Chemistry and Space Charge Potential," *J. Am. Ceram. Soc.*, 76:2437-2446 (1993); Ikeda et al., "Space Charge Segregation at Grain Boundaries in Titanium Dioxide: Part II, Model Experiments," *J. Am. Ceram. Soc.*, 76:2447-2459 (1993).) We have experimentally observed nonstoichiometry and extended solid solution behavior consistent with space-charge influenced behavior of nanocrystals in these materials. Accordingly, while not being bound by any particular theory, we address the possible origins of this behavior.

Consider a starting point of a stoichiometric $LiFePO_4$ olivine compound that is then allowed to equilibrate its free surface with its surroundings. The surface is likely to become enriched in the ion having the lowest defect formation energy and/or sufficient mobility to be removed preferentially to the surface. In $LiFePO_4$, this ion is energetically and kinetically most likely to be lithium. Creation of a lithium-rich surface must leave a lithium-deficient interior, in which the deficiency corresponds to the presence of lithium vacancies. As with other compounds exhibiting space-charge behavior, the lithium deficiency is not likely to be distributed uniformly across the interior. Instead, the lithium vacancies may be preferentially concentrated near the surface in a space-charge layer. The spatial extent of this layer depends at thermal equilibrium on the defect concentration, the dielectric constant of the material, and the temperature. If the system is not at equilibrium, the extent of the space-charge layer depends on transport kinetics of the ions and defects as well.

Figure 17:
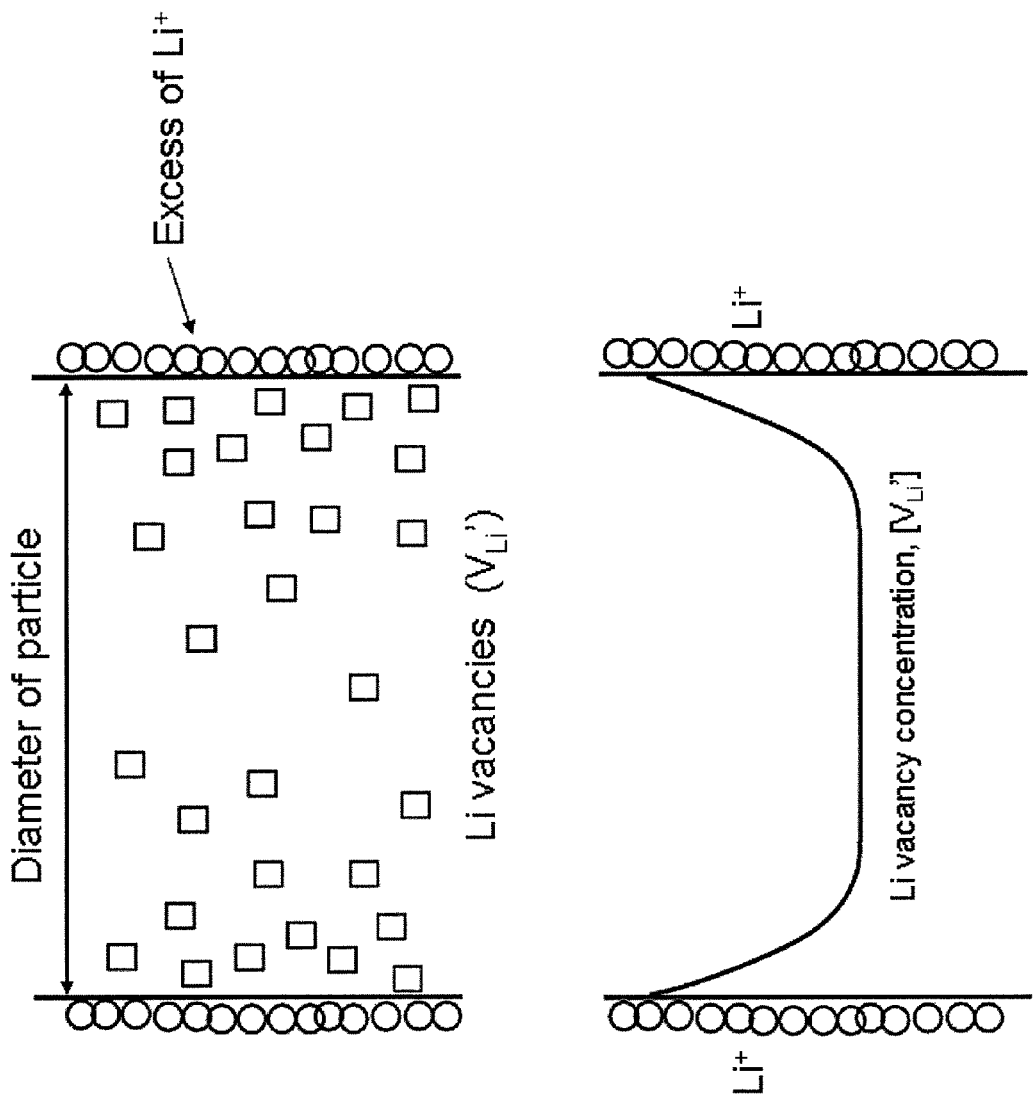
FIG. 17 is a schematic illustration of the spatial distribution of space-charge defects in a nanoscale lithium storage material according to certain embodiments.

The spatial distribution of defects is shown schematically in FIG. 17. The spatial extent of the space-charge layer can be of the order of one to several nanometers. The near-surface concentration of vacancies or other defects can be many times greater than the concentration that would be tolerated in a bulk crystal as a solid solution, i.e., without having precipitation or phase-separation. Thus, for a sufficiently small nanoparticle, nanorod, nanofiber or thin film, the interior of the particle has a measurably higher lithium deficiency than a conventional particle. Overall, the particle now behaves in a nonstoichiometric manner, especially if the Faradaic behavior of the $Li^+$ at the surface differs from that in the bulk. X-ray diffraction measurements and electrochemical tests can detect these differences compared to conventional materials. Furthermore the surface lithium ions can be reacted easily by surface reactions with adjacent media such as liquid electrolyte, or evaporated upon heating or reaction with the gas phase as a lithium oxide or lithium carbonate species. In such instances, the nanoparticle is left more lithium-deficient than a conventional particle or crystal, yet said defects giving rise to the nonstoichiometry remain as a solid solution rather than causing the nanoparticles to form new and separate phases as in a conventional material. In the case of a near-surface enrichment of lithium vacancies, the $Fe^{3+}/Fe^{2+}$ ratio also can vary spatially with distance from the surface, and provide not only greater electronic conductivity to the particle as a whole, but a greater electronic conductivity at the surface of the particle than in the interior.

It has also been unexpectedly discovered that materials providing a high charge rate capability differ in characteristics from those providing a high discharge rate capability. Specifically, the critical specific surface area below which, or critical particle size above which, qualitatively different phase transformation kinetics occurs differs for the charge process (lithium extraction) compared to the discharge process (lithium insertion) of the same material. In general a higher specific surface area or finer particle size is required to obtain a given high charge C-rate compared to a given high discharge C-rate. Example 5 gives detailed examples of such behavior It is recognized that the extent of solid solution in the subject materials possess a temperature dependence as shown in FIG. 4A. Thus, the criteria for having high charge rate and high discharge rate capability necessarily include a temperature of use. While in actual use, the temperature of a storage battery may vary widely, and may for example rise due to resistive heating or vary due to external heating or cooling, it is nonetheless possible to define suitable materials according to their performance at a fixed ambient temperature using a standard test which can be appreciated and readily conducted by those skilled in the art. One such test is the potentiostatic intermittent titration test (PITT), which is widely used by those skilled in the art of electrochemistry and battery materials, in which small increments or decrements of voltage (<0.1V) are applied to an electrochemical cell, and the current flow is measured upon each voltage step. As shown previously, the total of current flow at a given voltage can be used as a measure of the extent of lithium nonstoichiometry, allowing the phase diagram to be established, while the rate of current flow can be used as a measure of the rate capability of the material. Thus, as described in Example 5, the inherent rate capability of a material can be determined using a PITT measurement.

The fact that the materials of the invention have significantly differing charge and discharge rate capability is important to numerous applications. For example, in a hybrid electric vehicle (HEV) application, it is not only necessary to be able to deliver electrical energy rapidly during discharge of the battery pack, it is necessary to have a high charge rate capability in order to capture a maximum amount of regenerative braking energy. Thus a battery that provides only a high discharge rate, but not a high charge rate, is severely limited in its utility for HEVs. As another example, a cellphone or laptop computer can benefit from a short charging time (fast charging rate). However, the discharge rate is typically much slower since the device operates on battery power over a period of hours to days. In this instance, a battery that merely has high discharge rate capability but not high charge rate capability is limited in its utility.

In at least some embodiments, the nanoscale ion storage materials described herein typically contain less than about 5 weight percent, or about 3 weight percent, of any additional phase that does not substantially store ions, but may provide added electrical conductivity. Such additional phases include, for example, carbon, a metal, or an intermetallic phase, such as a metal phosphide, metal carbide, metal nitride, or mixed intermetallic compound, such as metal carbide-nitride or metal carbide-phosphide. In certain embodiments, for use as a storage electrode, the nanoscale material typically is formulated into an electrode by standard methods, including the addition of a few weight percent of a polymeric binder, and less than about 10 weight percent of a conductive additive, such as carbon. In at least some such embodiments, the electrodes typically are coated onto one or both sides of a metal foil, and optionally pressed to a coating thickness of between about 30 micrometers and about 200 micrometers, providing a charge storage capacity of between about 0.25 $mAh/cm^2$ and about 2 $mAh/cm^2$. Such electrodes can be used as the positive or negative electrode in a storage battery. Their performance can be evaluated, for example, using laboratory cells of the coin-cell or so-called Swagelok® cell types, in which a single layer of electrode is tested against a counterelectrode (typically lithium metal when the nanoscale material is a lithium storage material) using galvanostatic (constant current) or potentiostatic (constant voltage) tests or some combination of the two. Under galvanostatic conditions, the current rate can be described as "C-rate," in which the rate is C/n, and n is the number of hours required for substantially complete charge or discharge of the cell between a selected upper and lower voltage limit.

In certain embodiments, when used as the positive electrode in a lithium battery, the electrodes are typically assembled into multilayer laminated cells of wound or stacked configuration, using lithium metal or an anode-active lithium storage electrode as the negative electrode. Non-limiting examples of suitable negative electrode materials include lithium metal, carbon, an intermetallic compound, or a metal, metalloid or metal alloy that includes such lithium-active elements as Al, Ag, B, Bi, Cd, Ga, Ge, In, Pb, Sb, Si, Sn or Zn. The negative electrode material can be selected or designed for high rate capability. The storage batteries thus assembled can employ a porous electronically insulating separator between the positive and negative electrode materials, and a liquid, gel or solid polymer electrolyte. The storage batteries can have electrode formulations and physical designs and constructions that are developed through methods well-known to those skilled in the art to provide low cell impedance, so that the high rate capability of the nanoscale ion storage material can be utilized.

The nanoscale ion storage materials described herein, when tested in such laboratory cells or in storage batteries, will exhibit greatly improved capacity retention at high charge and discharge rates compared to their coarse-grained counterparts. Typically, over a voltage range in which the upper voltage limit is about 120% of, and the lower voltage limit is about 50% of, the average voltage exhibited by the cell at a low rate of C/5 or less, the discharge capacity measured at a 5C rate compared to the capacity measured at a low rate of C/5 or less (i.e., the capacity retention) will be about 80% or greater, in some cases about 90% or greater, or about 95% or greater. At a 10C rate, the capacity retention can be about 75% or greater, in some cases about 85% or greater, for example, about 90% or greater, or about 93% or greater. At a 20C rate, the capacity retention can be about 60% or greater, in some cases about 70% or greater, for example, about 80% or greater, or about 85% or greater. At a 35C rate, the capacity retention can be about 50% or greater, in some cases about 60% or greater, for example, about 75% or greater, or about 80% or greater. At a 50C rate, the capacity retention can be about 30% or greater, in some cases about 40% or greater, for example, about 50% or greater, or about 60% or greater.

In some embodiments, when used in a complete wound or stacked multilayer cell having at least 5 Wh energy at a C/5 or lower discharge rate, the nanoscale materials described herein can provide cells with the following levels of specific power (power density) and specific energy (energy density) for substantially complete discharge starting from a fully charged state (i.e., 100% depth of discharge). The cells can exhibit, for example, specific power of at least about 500 W/kg (1000 W/L) at specific energy of at least about 100 Wh/kg (205 Wh/L), specific power of at least about 950 W/kg (2000 W/L) at specific energy of at least about 95 Wh/kg (190 Wh/L), specific power of at least about 1300 W/kg (2500 W/L) at specific energy of at least about 90 Wh/kg (180 Wh/L), and specific power of at least about 1600 W/kg (3200 W/L) at specific energy of at least about 85 Wh/kg (175 Wh/L). It is understood that for shallower depth of discharge, the specific power and power density can be significantly higher than those given above.

The following non-limiting examples further illustrate certain embodiments.

EXAMPLE 1

Lithium iron phosphate of overall composition $LiFePO_4$ was prepared using the following proportions of starting materials:

| | |
|---|---|
| $Li_2CO_3$ (Alfa-Aesar, 99.999%) | 0.739 g |
| Iron (II) oxalate (Alfa-Aesar, 99.999%) | 3.598 g |
| Ammonium phosphate (Sigma-Aldrich ®, 99.998%) | 2.301 g |

While these basic components are known as starting materials for the synthesis of conventional $LiFePO_4$, here through the use of a high purity acetone as the solvent (reagent grade, J. T. Baker), and using extended mixing to allow the starting components to undergo a gas-evolving mechanochemical reaction, a precursor is obtained that upon firing yields a low carbon, very high specific surface area nanoscale phosphate. The dry components were weighed and mixed with a sufficient quantity of high purity acetone to create a free-flowing suspension, and the mixture was roller-milled in a sealed polypropylene jar using zirconia milling media for 24 hours, obtaining a homogeneous and finely-divided precursor suspension. The precursor was thoroughly dried and then heat treated in a tube furnace under flowing argon gas (grade 5.0), first at 350° C. for 10 h and then at 600° C. for 20 h. After heat treatment, the specific surface area was measured using the BET method and found to be 38.6 $m^2/g$, for which the equivalent spherical particle diameter was calculated to be 43.2 nm, assuming a crystal density of 3.6 $g/cm^3$. The carbon content was analyzed by the combustion method and found to be below 3 weight percent, such that the measured surface area can be predominantly attributed to the nanoscale phosphate phase. For powders prepared by this procedure, transmission electron microscopy imaging such as in FIGS. 1 and 2 showed that the observed average particle diameter was close to the equivalent spherical particle size calculated from the BET specific surface area.

Figure 18:
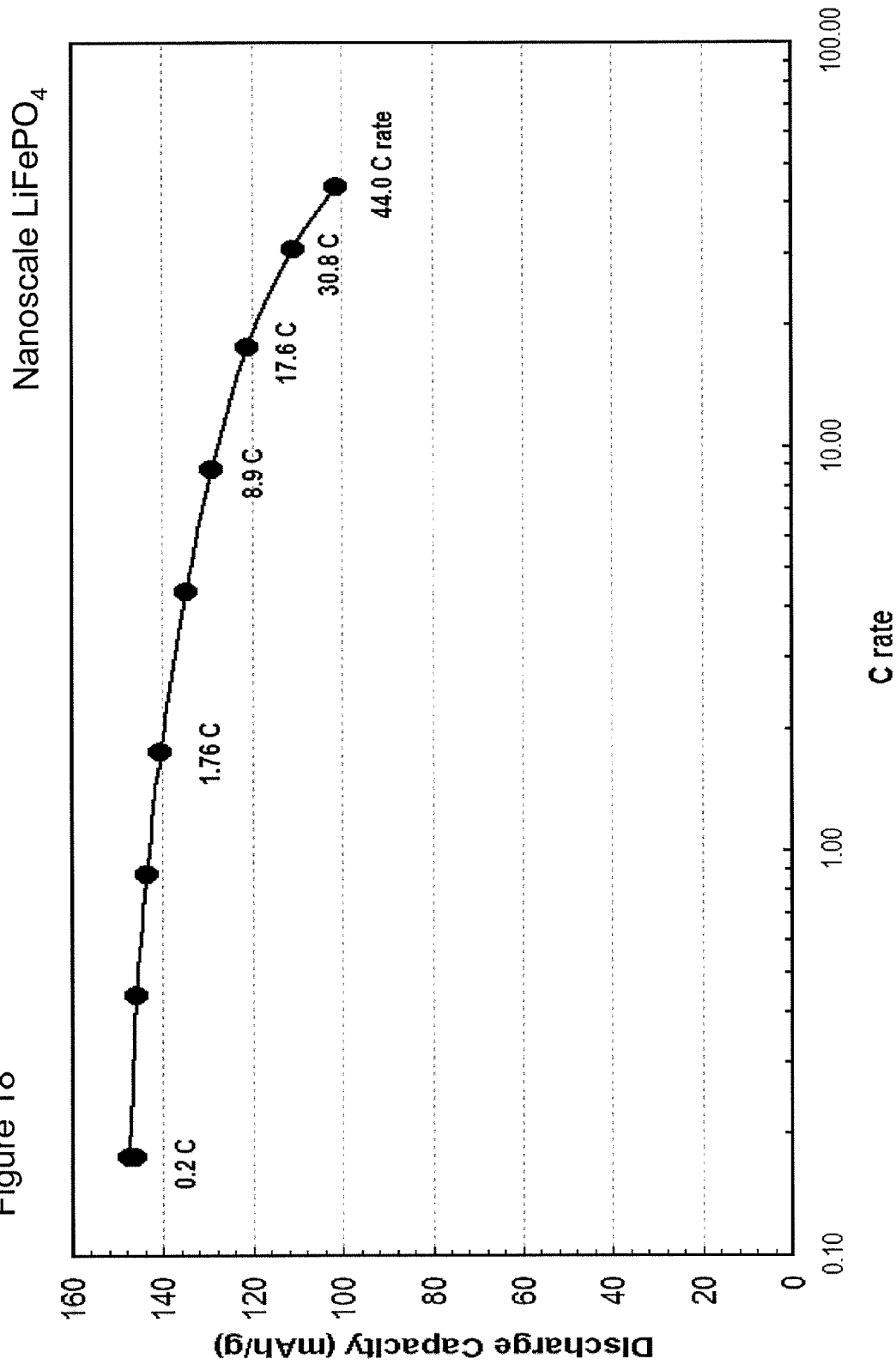
FIG. 18 shows the specific capacity of the nanoscale lithium iron phosphate of Example 1 as measured from a Swagelok® cell.

The fired powder was formulated into an electrode having the following composition:

| | |
|---|---|
| Nanoscale lithium iron phosphate powder | 3.95 g |
| Super P carbon | 0.50 g |
| Kynar 2801 binder | 0.55 g |
| γ-butyrolactone (solvent) | 28.5 g | and mixed to create a free flowing suspension, then cast in a uniform layer onto aluminum foil. The coating was dried in vacuum at 100-110° C., after which it was measured to have a thickness of about 100 micrometers, and punched into discs of 1-2 cm diameter as appropriate to fit Swagelok® or coin cells. The electrode coatings were assembled into lithium half-cells using Swagelok® or coin cell hardware, using a microporous polymer separator, lithium foil as the negative electrode (total lithium content at least ten times greater than the theoretical storage capacity of the positive electrode), and a conventional nonaqueous lithium ion battery electrolyte containing $LiPF_6$ as the lithium salt. FIG. 18 shows the specific capacity of the nanoscale lithium iron phosphate as measured from a Swagelok® cell. The ability of the nanoscale material to deliver high capacities at high charge or discharge rates is remarkable. The discharge capacity retention here is used to describe the percentage of the capacity measured at a particular C-rate, over the voltage range 2.0-3.8V, compared to the capacity observed at C/5 rate over the same voltage range, as shown in FIG. 16. At 1.8C rate, the capacity retention was 95.9%; at 4.4C rate, the retention was 92.1%; at 9C rate, the retention was 88.1%; at 18C rate, it was 82.6%; at 31C rate, it was 75.6%; and at 44C rate, it was 69.1%. Those skilled in the art of battery materials will recognize that these are extraordinarily high capacity retention values compared to conventional ion storage materials. The capacity measured during the first charging cycle for this sample was about 6.6% less than the capacity during the first discharge cycle, showing that the nonstoichiometry x of the as-produced material is about 6.6%.

EXAMPLE 2

A nanoscale ion storage material having overall composition $Li_{0.99}FePO_4$ was synthesized and tested following procedures as described in Example 1, except that a larger batch size was made and different sources of starting materials were used. The composition was made using the following proportions of starting materials:

| | |
|---|---|
| $Li_2CO_3$ (SQM) | 7.4337 g |
| Iron (II) oxalate (Elementis) | 36.2696 g |
| Ammonium phosphate (Heico) | 22.5541 g |

A larger sealed polypropylene container, and steel milling media were used to mill the starting materials for 72 hours. Firing of the dried powder was conducted in nitrogen of 99.999% purity, and the final firing condition was 700° C. for 5 h. This powder was easured by the BET method to have a specific surface area of 45.4 $m^2/g$, corresponding to an equivalent spherical particle diameter of 36.7 nm. Combustion analysis showed that it had a residual carbon concentration of about 3 wt %. FIG. 5 shows test results from electrodes and lithium half-cells constructed using Swagelok® hardware as in Example 1. It is seen that the first-charge capacity was lower than the first-discharge capacity by 11.5%, both being measured at about a C/5 rate, showing that the initial nonstoichiometry of the sample may be about 11.5%. At higher C-rates, outstanding capacity retention was observed.

At a 5C rate, the capacity retention was about 95%, at a 10C rate, the capacity retention was about 90%, and at a 20C rate, the capacity retention was in the range 66-72% for three cells tested.

EXAMPLE 3

Nanoscale ion storage materials having overall compositions $LiFePO_4$ and $Li_{0.95}FePO_4$ were synthesized and tested following procedures as described in Example 2, with the mass of lithium carbonate being adjusted so as to achieve the specified overall compositions. The $LiFePO_4$ and $Li_{0.95}FePO_4$ powders were measured by the BET method to have a specific surface areas of 39.78 $m^2/g$ and 46.2 $m^2/g$ respectively, corresponding to equivalent spherical particle diameters of 41.9 nm and 36.1 nm respectively. Combustion analysis showed the two powders to both have residual carbon concentrations of 2.3 wt % and 3 wt % respectively. FIGS. 7 and 8 show the C/50 charge and discharge curves for these two samples compared to a commercially purchased carbon-coated $LiFePO_4$ from Sigma-Aldrich® Chemical Company of several micrometer average particle size and markedly inferior rate capability. Due to the very high rate capability of these materials, see FIG. 19, these low-rate charge/discharge curves show the near-equilibrium voltages of the cells. From these curves it is seen that during continuous charge and discharge, a lithium nonstoichiometry x of at least about 15%, and y of at least about 10% is obtained. FIGS. 12-14 show PITT measurements of the nanoscale $Li_{0.95}FePO_4$ sample as described earlier. During a single-step discharge to a voltage 5 mV above the OCV, 4.5% of the total discharge capacity measured at C/50 rate of 160 mAh/g (3.8V to 2V) is measured, showing that greater than about 4.5% nonstoichiometryy can be obtained during dynamic discharging conditions. During a single-step charge to a voltage 5 mV below the OCV, 10.5% of the total charge capacity (2.9V to 3.8V) was measured, showing that greater than about 10.5% nonstoichiometry x exists under dynamic charging conditions. By comparison, the y and x values measured from the capacities at 5 mV above and below the OCV for the comparison sample from Sigma-Aldrich® Chemical is only 0.7% and 1.2% respectively. FIG. 16 and Tables 1 and 2 show X-ray powder diffraction measurements of the nanoscale $Li_{1-x}FePO_4$ sample as described earlier. From the Rietveld refinement of this sample, a crystallite size of about 28 nm was determined, which is close to the calculated equivalent spherical particle size and shows that the high surface area of the sample is due to nanoscale crystallites of the lithium iron phosphate and not due to a high surface area impurity or additive phase. FIG. 19 shows test results from three lithium half-cells constructed using Swagelok® hardware as in Example 2.

EXAMPLE 4

In this prophetic example, positive electrodes using a nanoscale ion storage materials, for example, those of Examples 1 and 3 (having been well-characterized in their electrochemical performance over a wide range of C-rates), are used to construct a wound cylindrical lithium-ion cell. A high-rate graphite anode is employed, such as one utilizing graphitized mesocarbon microbeads (MCMB, Osaka Gas Co.) of a few micrometers mean diameter. The performance of such cells, including charge capacity and energy at various C-rates, can be modeled from the volumes and masses of the cell constituents when the density, thickness and performance of individual electrodes in prototype cells is known, as in the present case. Starting from a fully charged state at 3.8V, and discharging to a lower voltage limit of 2.0V, i.e., for 100% depth of discharge, the model shows that such cells will exhibit specific power of at least about 500 W/kg (1000 W/L) at specific energy of at least about 100 Wh/kg (205 Wh/L), specific power of at least about 950 W/kg (2000 W/L) at specific energy of at least about 95 Wh/kg (190 Wh/L), specific power of at least about 1300 W/kg (2500 W/L) at specific energy of at least about 90 Wh/kg (180 Wh/L), and specific power of at least about 1600 W/kg (3200 W/L) at specific energy of at least about 85 Wh/kg (175 Wh/L). It is understood that for shallower depth of discharge, the specific power and power density can be significantly higher than these values.

EXAMPLE 5

The nanoscale ion storage material of composition $LiFePO_4$ and having a specific surface area of 39.8 $m^2/g$ described in Example 3 was used. In addition, a sample having a specific surface area of 48.8 $m^2/g$ was prepared by the same method, described in Example 2, with the exception that the final firing was carried out at 600° C. For comparison, the commercially-purchased carbon-coated $LiFePO_4$ from Sigma-Aldrich® Chemical Company having specific surface area of 14.8 $m^2/g$ described in Example 3 was used. All three materials were prepare into electrodes and tested in Swagelok® cells using the procedures of Example 1. OCV measurements were taken with the cells at 50% state of charge, at the measurement temperature of interest, and after waiting at least 12 hours. PITT measurements were conducted as described previously, starting from a fully discharged or charged state, and using voltage steps of 5 mV or 10 mV.

Figure 20:
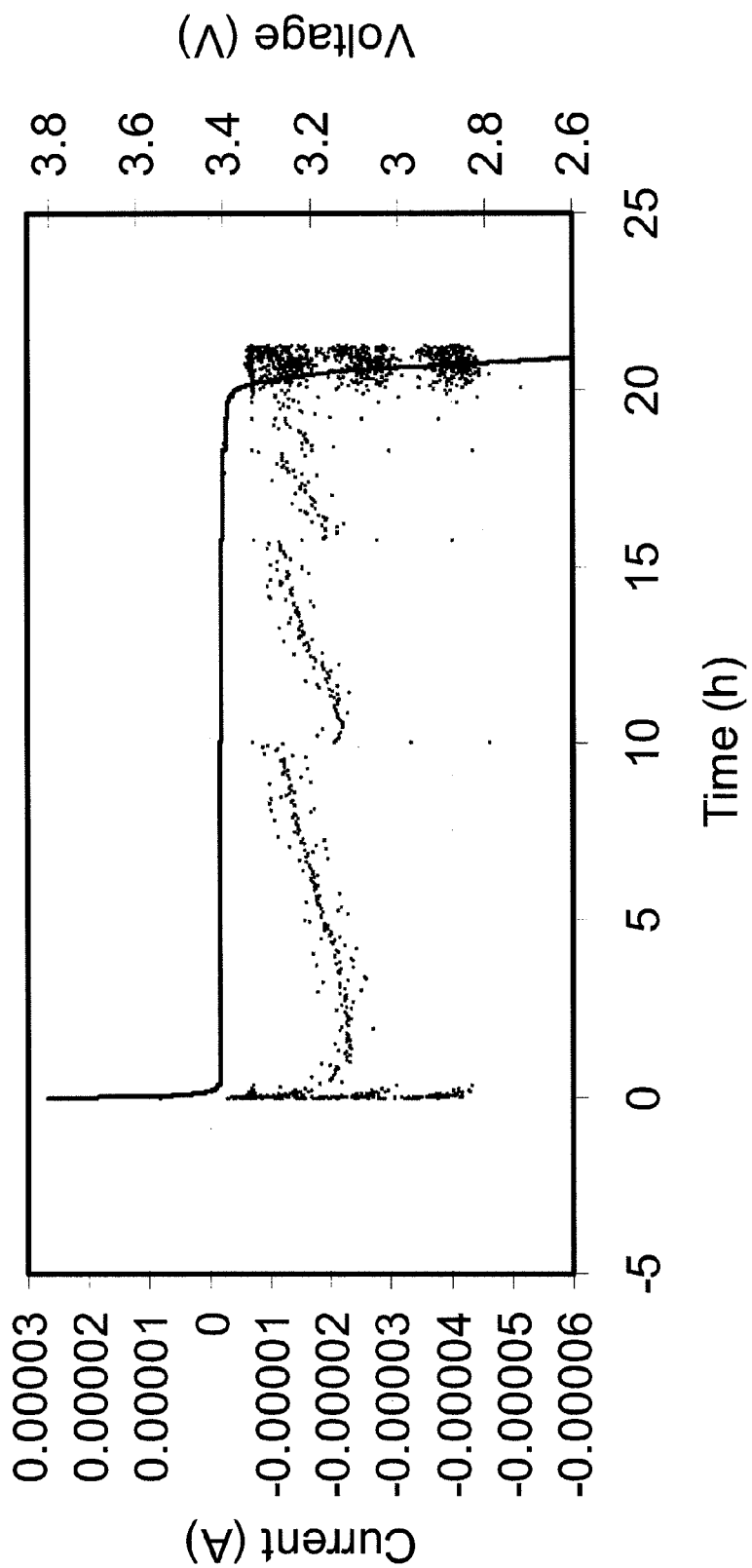
FIG. 20 shows the voltage and current traces upon discharging in a PITT measurement of the Sigma-Aldrich® sample described in Example 3 at 23° C.

Referring first to FIG. 9, it is seen that the Sigma-Aldrich® sample exhibits upon charging at room temperature (23° C.), for an overpotential of 50 mV with respect to the OCV, a characteristic behavior wherein the charging current rises slowly over time, peaking at about 4 hours, before decaying again. In FIG. 20, the discharge behavior at room temperature (23° C.) is shown, for 5 mV voltage decrements. A similar behavior is seen where at a constant voltage and overpotential (note that herein, when referring to the discharge process, the term "overpotential" is used to refer to the amount by which the applied voltage is below the OCV), the absolute value of the current rises slowly before decaying again over a period of several hours. The discharge capacity vs. C-rate of this material, shown in FIG. 6, is clearly inferior to the nanoscale ion storage materials of the invention. It is thus apparent from both the magnitudes of the currents in FIGS. 9 and 20, and the results in FIG. 6, that this characteristic PITT behavior results in a low rate capability in both charge and discharge.

Figure 21:
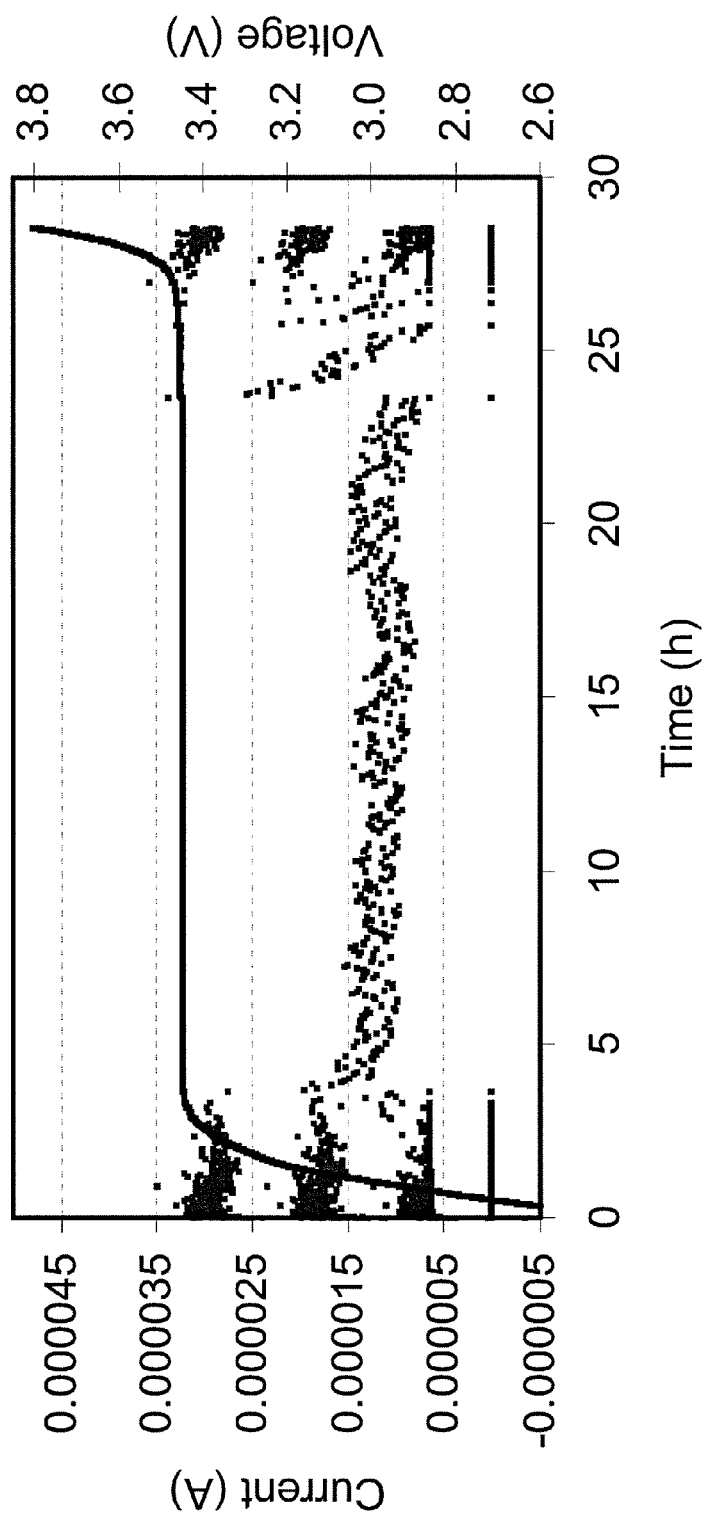
FIG. 21 shows the voltage and current traces upon charging in a PITT measurement of a nanoscale $LiFePO_4$, 39.8 $m^2/g$, 23° C.
Figure 22:
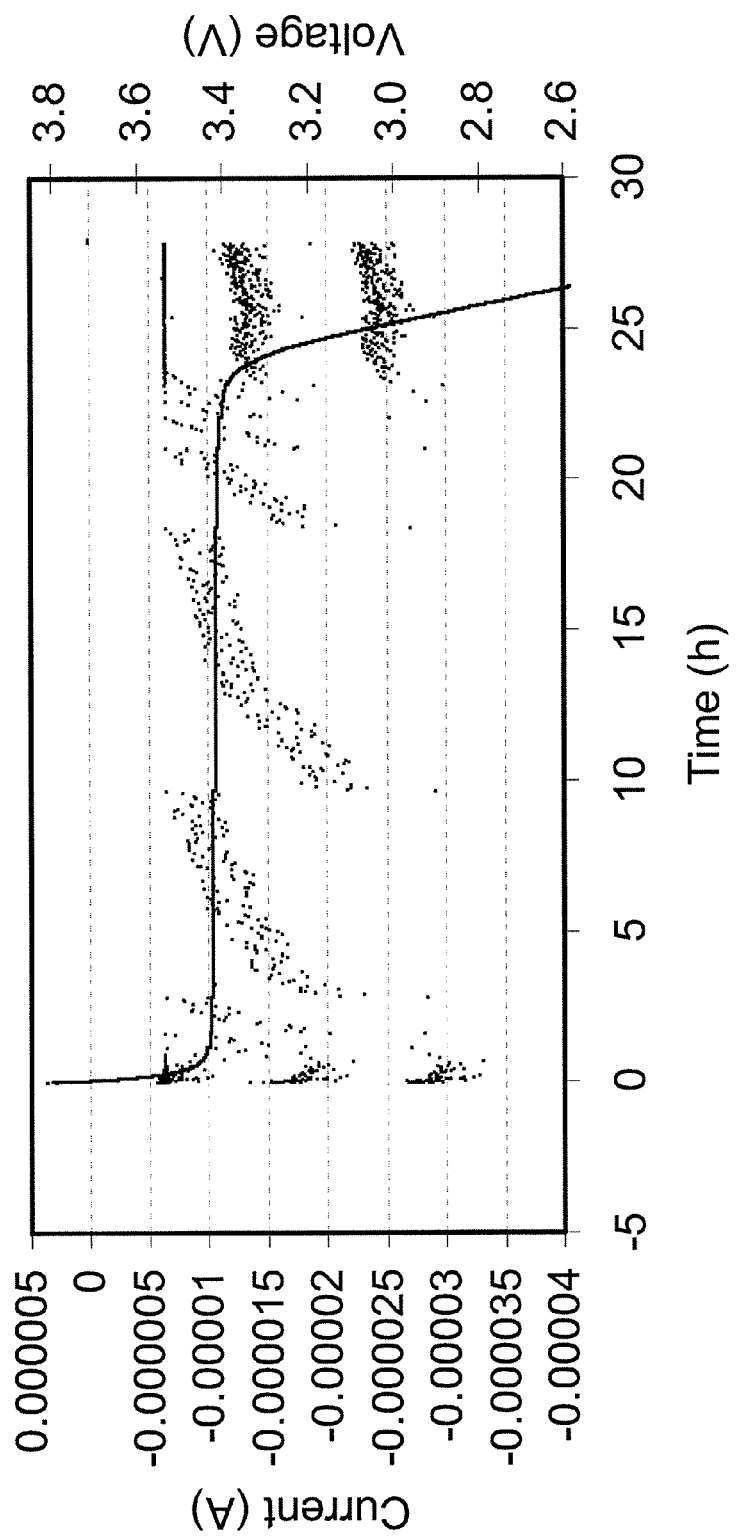
FIG. 22 shows the voltage and current traces upon discharging in a PITT measurement of a nanoscale $LiFePO_4$, 39.8 $m^2/g$, 23° C.
Figure 23:
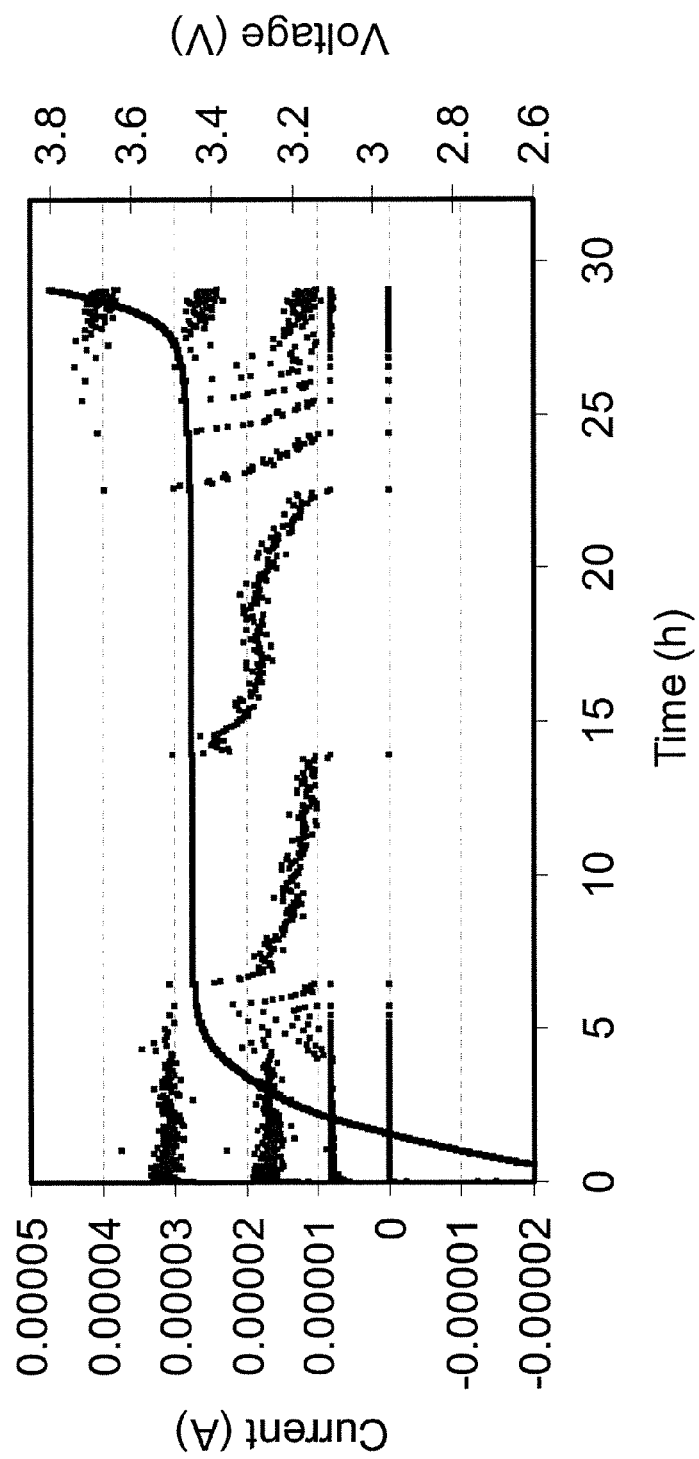
FIG. 23 shows the voltage and current traces upon charging in a PITT measurement of a nanoscale $LiFePO_4$, 48.8 $m^2/g$, 23° C.
Figure 24:
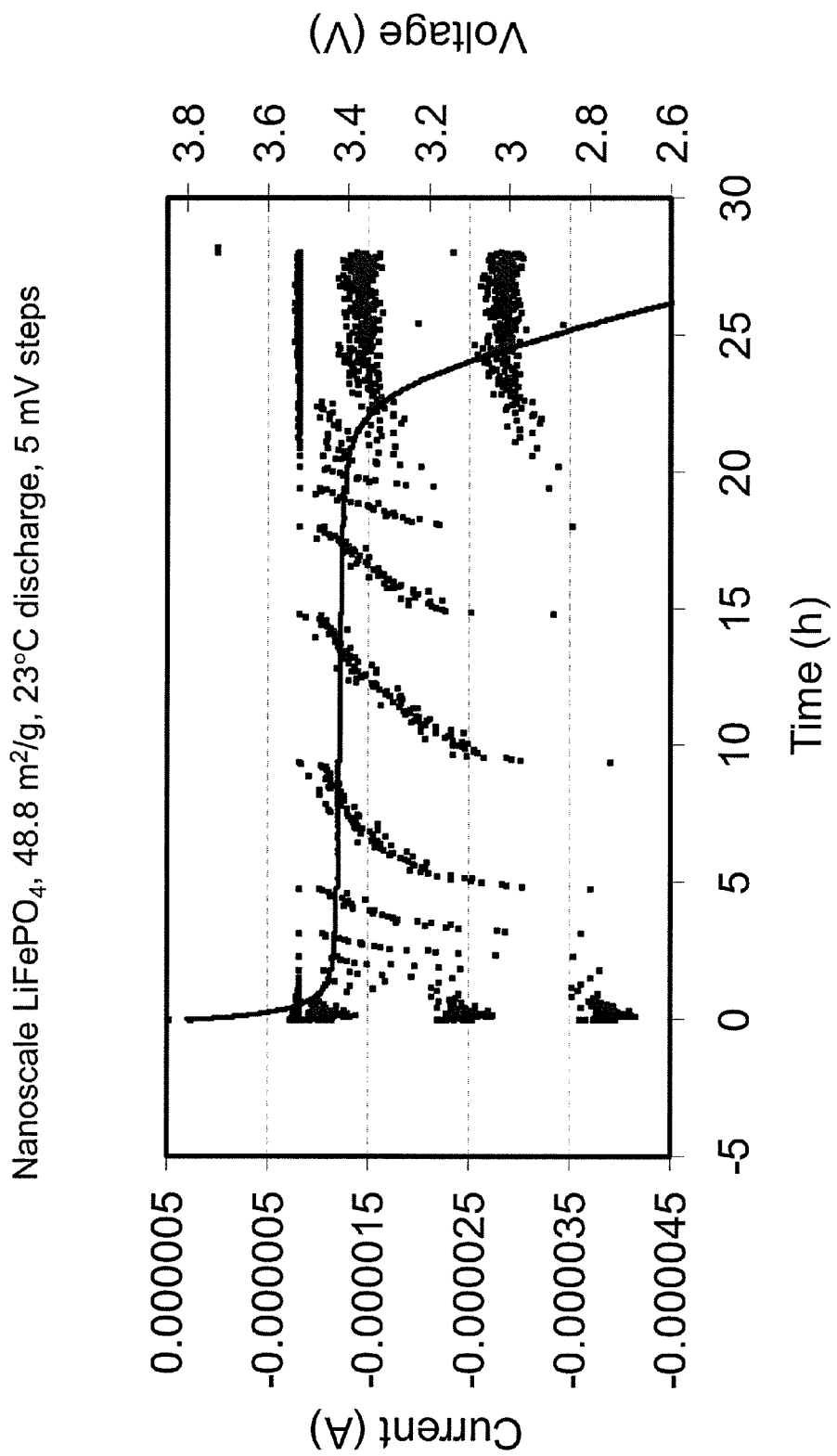
FIG. 24 shows the voltage and current traces upon discharging in a PITT measurement of a nanoscale $LiFePO_4$, 48.8 $m^2/g$, 23° C.

The corresponding PITT data for the nanoscale $LiFePO_4$ of 39.8 $m^2/g$ and 48.8 $m^2/g$ respectively are shown in FIGS. 21-24. FIGS. 21 and 22 show the 23° C. charging and discharging results for the sample of 39.8 $m^2/g$. In FIG. 21, it is seen that on the voltage step where the greatest total amount of current flows, the current decreases essentially monotonically until the lower current limit of the PITT measurement is reached, and the voltage is stepped up again. In FIG. 22, however, it is seen that during discharge, the current decreases more quickly with time, and also has large absolute values in general. This discharge curve behavior corresponds to a high discharge capacity at high rates, not shown but very similar to that in FIGS. 5 and 19. The charge capacity vs. C-rate, while still markedly higher than that of the Sigma-Aldrich® sample, is not as high as the discharge capacity at equivalent C-rate. Thus it is clearly shown that the requirements of the material in order to obtain high charge rate behavior differ from those required to obtain high discharge rate behavior. FIGS. 23 and 24 show similar results for the sample of 48.8 m²/g specific surface area, from which the same conclusions are drawn.

Figure 25:
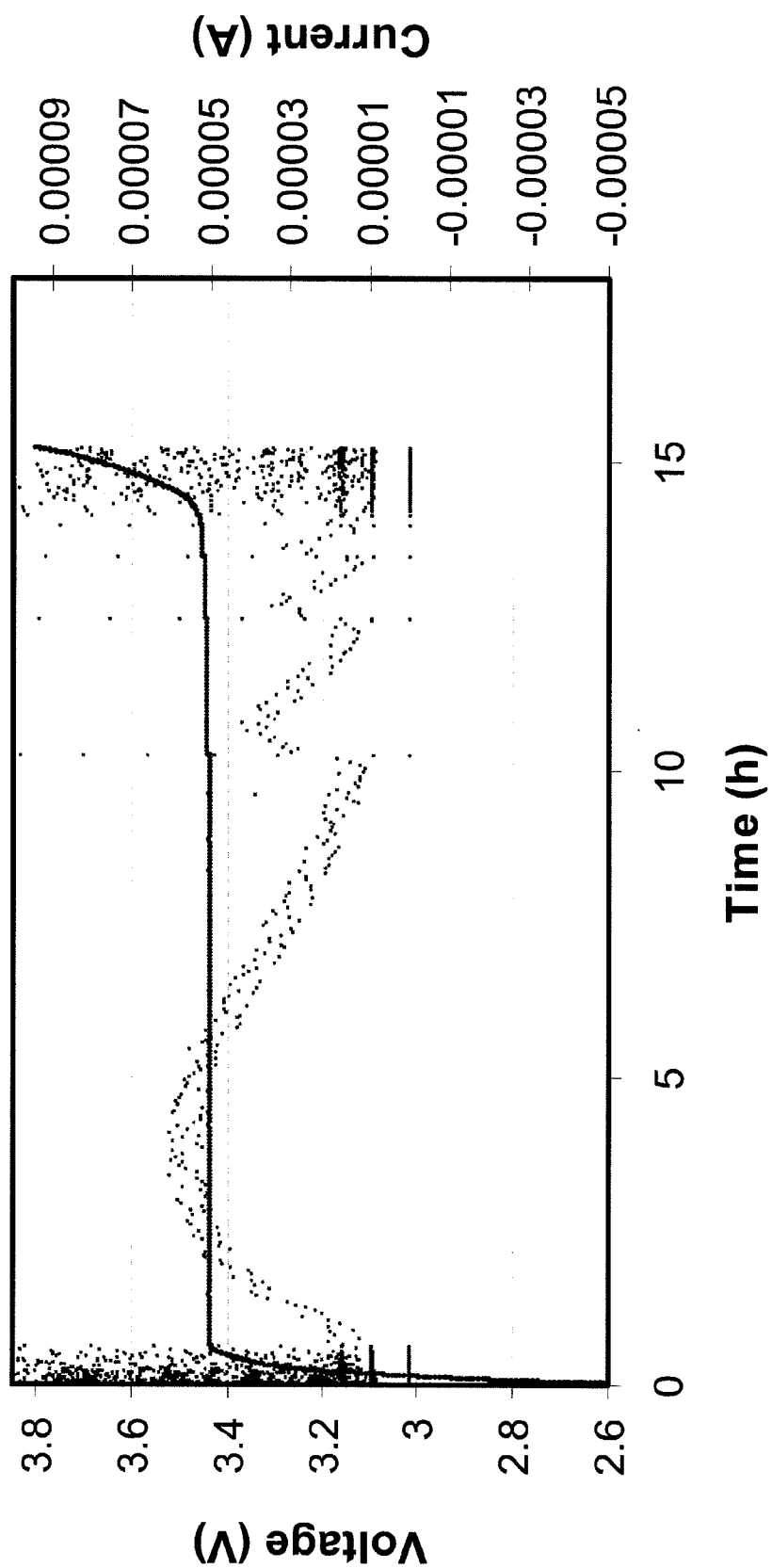
FIG. 25 shows the voltage and current traces upon charging in a PITT measurement of the Sigma-Aldrich® sample of Example 3 at 45° C.
Figure 26:
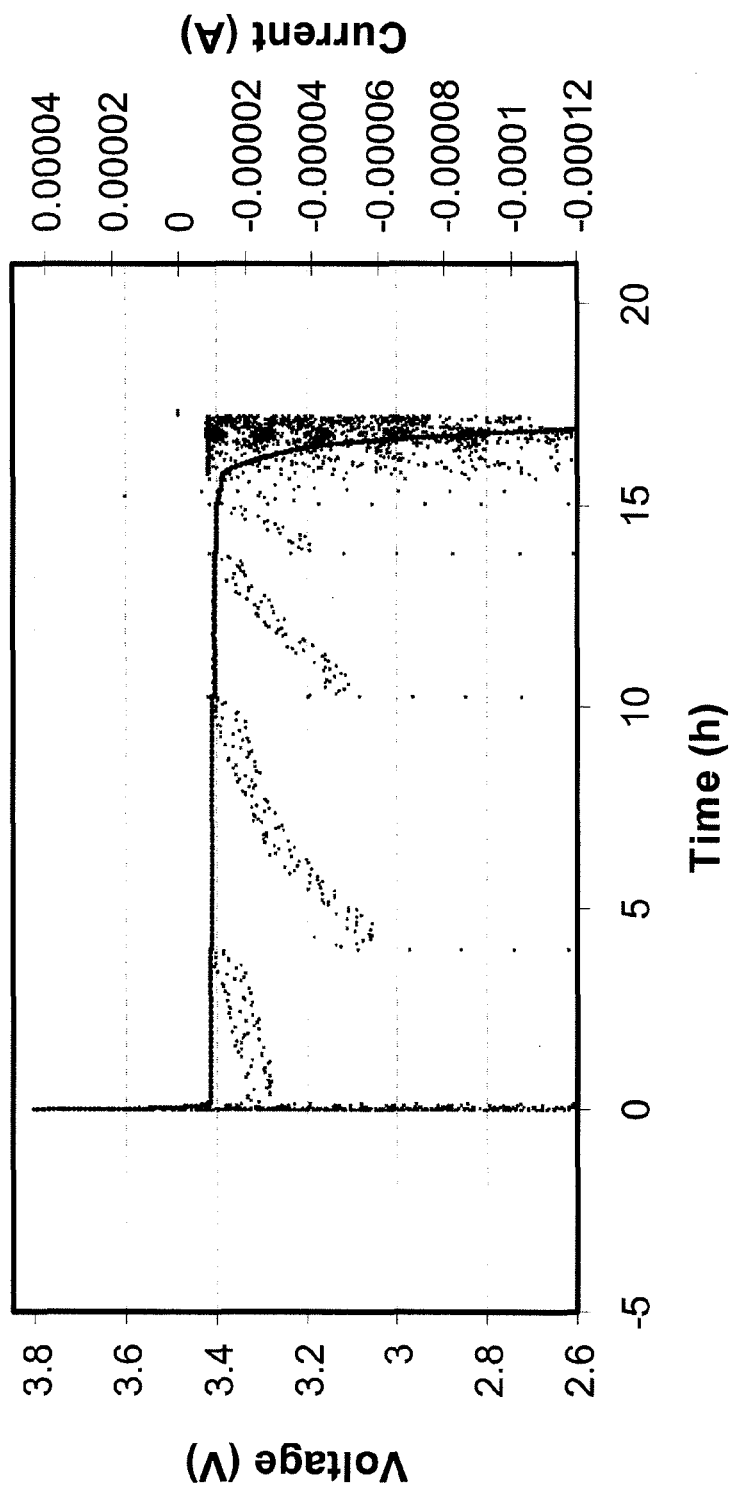
FIG. 26 shows the voltage and current traces upon discharging in a PITT measurement of the Sigma-Aldrich® sample of Example 3 at 45° C.
Figure 27:
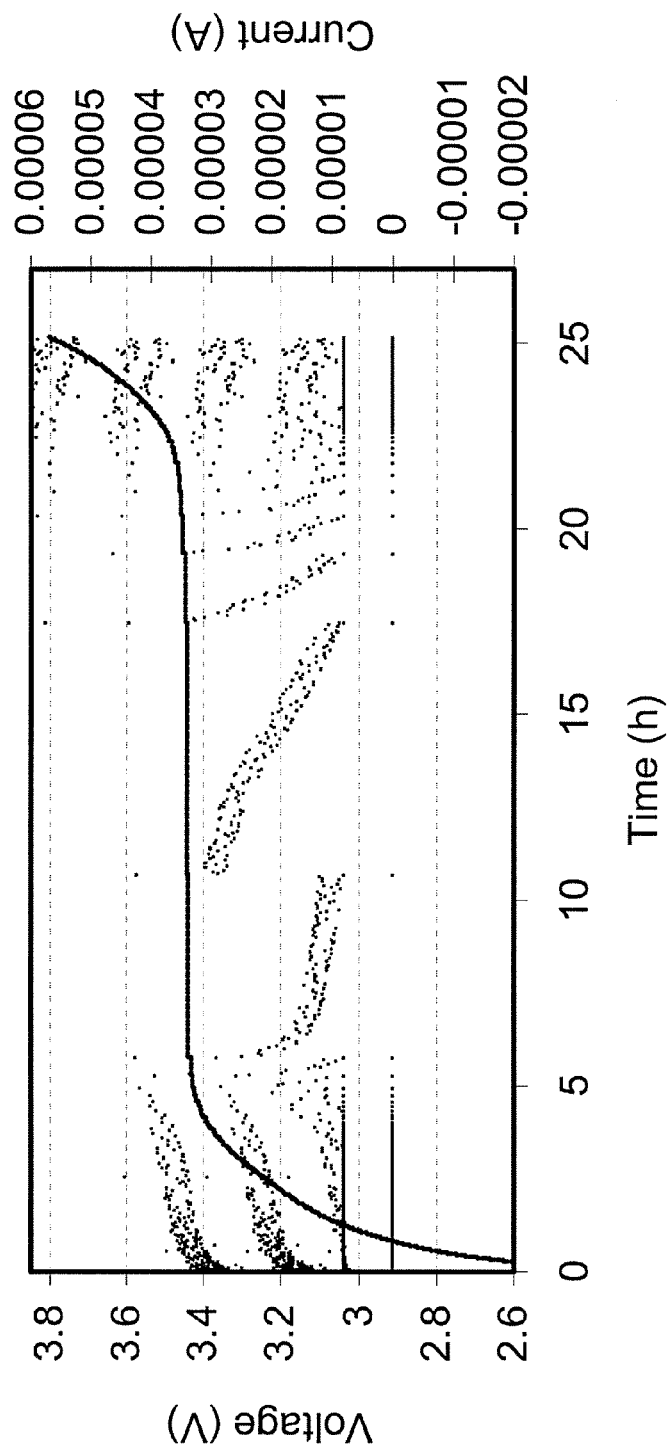
FIG. 27 shows the voltage and current traces upon charging in a PITT measurement of a nanoscale $LiFePO_4$, 49.8 $m^2/g$, 45° C.
Figure 28:
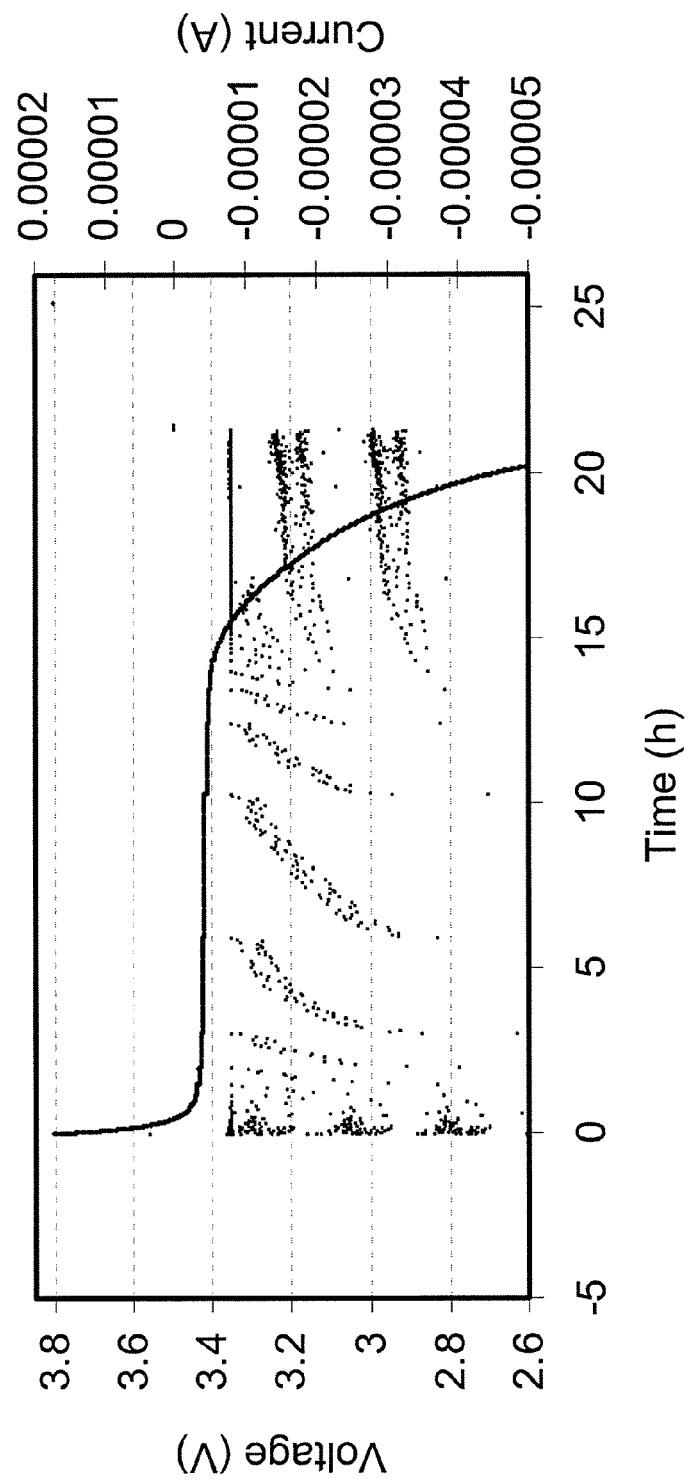
FIG. 28 shows the voltage and current traces upon discharging in a PITT measurement of a nanoscale $LiFePO_4$, 49.8 $m^2/g$, 45° C. charge.

The phase diagrams in FIGS. 3A and 4A imply that with changes in temperature, the extent of solid solution will change, and along with it, the rate capability of the materials. Thus the PITT behavior may be expected to change with temperature. In FIGS. 25-28, PITT results at 45° C. for the Sigma-Aldrich® sample and the nanoscale sample (48.8 m²/g) are shown. In FIG. 25, it is seen that at this elevated temperature, the Sigma-Aldrich® sample still shows the characteristic slow rise in current over about 4 hours, corresponding to poor charge rate performance. FIG. 26 shows the discharge rate behavior at 45° C. Here a monotonic decrease in the absolute value of the current is seen on each voltage step, corresponding to improved discharge rate performance. It is therefore seen that for this sample, at 45° C., the amount of energy obtainable at high discharge rates may be significantly improved compared to room temperature, but the amount of energy that can be stored upon high rate charge is not substantially improved. In FIGS. 27 and 28, PITT results for the nanoscale LiFePO₄ of 48.8 m²/g specific surface area rate are shown for charge and discharge respectively. By comparison, this material exhibits PITT characteristics corresponding to excellent charge and discharge performance. The same is seen for the sample of 39.8 m²/g specific surface area.

Thus this Example shows that, firstly, for a given material, at a constant temperature the charge and discharge capacity at equivalent C-rate will differ. Secondly, in general the charge capacity will be lower at the same C-rate, necessitating a different set of selection criteria for the design of high charge rate batteries compared to those which only need to exhibit high discharge rate capability.

As will be apparent to one of skill in the art from a reading of this disclosure, the present invention can be embodied in forms other than those specifically disclosed above. The particular embodiments described above are, therefore, to be considered as illustrative and not restrictive. The scope of the invention is as set forth in the appended claims, rather than being limited to the examples contained in the foregoing description.

What is claimed is:

1. A nanoscale lithium iron phosphate composition forming a single crystalline phase of the olivine structure at room temperature and having a solid solution composition $Li_{1-x}FePO_4$, wherein the lithium iron phosphate has a specific surface area greater than 15 m²/g and $0.05 < x \leq 0.3$.

2. The lithium iron phosphate composition of claim 1, wherein $0.15 < x \leq 0.3$.

3. The lithium iron phosphate composition of claim 1, wherein $0.06 < x \leq 0.3$.

4. The lithium iron phosphate composition of claim 1, wherein $0.07 < x \leq 0.3$.

5. The lithium iron phosphate composition of claim 1, wherein $0.08 < x \leq 0.3$.

6. The lithium iron phosphate composition of claim 1, wherein $0.09 < x \leq 0.3$.

7. The lithium iron phosphate composition of claim 1, wherein $0.10 < x \leq 0.3$.

8. The lithium iron phosphate composition of claim 1, wherein the lithium iron phosphate has a specific surface area greater than 20 m²/g.

9. The lithium iron phosphate composition of claim 1, wherein the lithium iron phosphate has a specific surface area greater than 25 m²/g.

10. The lithium iron phosphate composition of claim 1, wherein the lithium iron phosphate has a specific surface area greater than 30 m²/g.

11. A lithium storage battery comprising the lithium transition metal phosphate compound of claim 1.

* * * * *

UNITED STATES PATENT AND TRADEMARK OFFICE
CERTIFICATE OF CORRECTION

PATENT NO. : 8,323,832 B2  Page 1 of 1
APPLICATION NO. : 11/672931
DATED : December 4, 2012
INVENTOR(S) : Yet-Ming Chiang et al.

It is certified that error appears in the above-identified patent and that said Letters Patent is hereby corrected as shown below:

In the Claims:

At column 32, claim number 1, line number 13, please delete "i-x" after "Li."

At column 32, claim number 1, line number 13, please insert --1-x-- after "Li."

At column 32, claim number 11, line numbers 35-36, please delete "transition metal phosphate compound" after "the lithium."

At column 32, claim number 11, line numbers 35-36, please insert --iron phosphate composition-- after "the lithium."

Signed and Sealed this
Twenty-seventh Day of May, 2014

Michelle K. Lee
*Deputy Director of the United States Patent and Trademark Office*